(12) United States Patent
Kohno et al.

(10) Patent No.: US 12,085,837 B2
(45) Date of Patent: Sep. 10, 2024

(54) ADAPTOR DEVICE, IMAGING APPARATUS, AND METHOD FOR CONTROLLING SAME

(71) Applicant: CANON KABUSHIKI KAISHA, Tokyo (JP)

(72) Inventors: Toru Kohno, Kanagawa (JP); Takayuki Shu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 17/865,269

(22) Filed: Jul. 14, 2022

(65) Prior Publication Data

US 2023/0021523 A1   Jan. 26, 2023

(30) Foreign Application Priority Data

Jul. 21, 2021 (JP) ................................ 2021-120276
Nov. 5, 2021 (JP) ................................ 2021-181189

(51) Int. Cl.
*G03B 17/56* (2021.01)
*F21K 5/16* (2006.01)
*G03B 15/05* (2021.01)

(52) U.S. Cl.
CPC ......... *G03B 15/0473* (2013.01); *G03B 15/05* (2013.01); *G03B 17/566* (2013.01); *G03B 2215/056* (2013.01)

(58) Field of Classification Search
CPC ............................................... G03B 2215/056
See application file for complete search history.

(56) References Cited

U.S. PATENT DOCUMENTS

| 8,757,904 B2* | 6/2014 | Hasuda ................ H04N 23/651 396/530 |
| 11,659,276 B2* | 5/2023 | Takanashi ............ H04N 23/663 348/345 |
| 11,733,592 B2* | 8/2023 | Kohno ................... G03B 31/00 396/301 |

FOREIGN PATENT DOCUMENTS

JP         2010-529749 A     8/2010

* cited by examiner

*Primary Examiner* — Leon W Rhodes, Jr.
(74) *Attorney, Agent, or Firm* — Canon U.S.A., Inc. IP Division

(57) ABSTRACT

In a first communication mode, a control unit controls a signal level of one contact based on a first command received from an imaging apparatus via another contact and a signal level indicated by an accessory device via yet another contact. In a second communication mode, the control unit receives a second command indicating the second communication mode and data via another contact. After the reception, the control unit transmits the data via still another contact. The control unit controls communication in the second communication mode based on the signal level of the one contact and the second command.

13 Claims, 20 Drawing Sheets

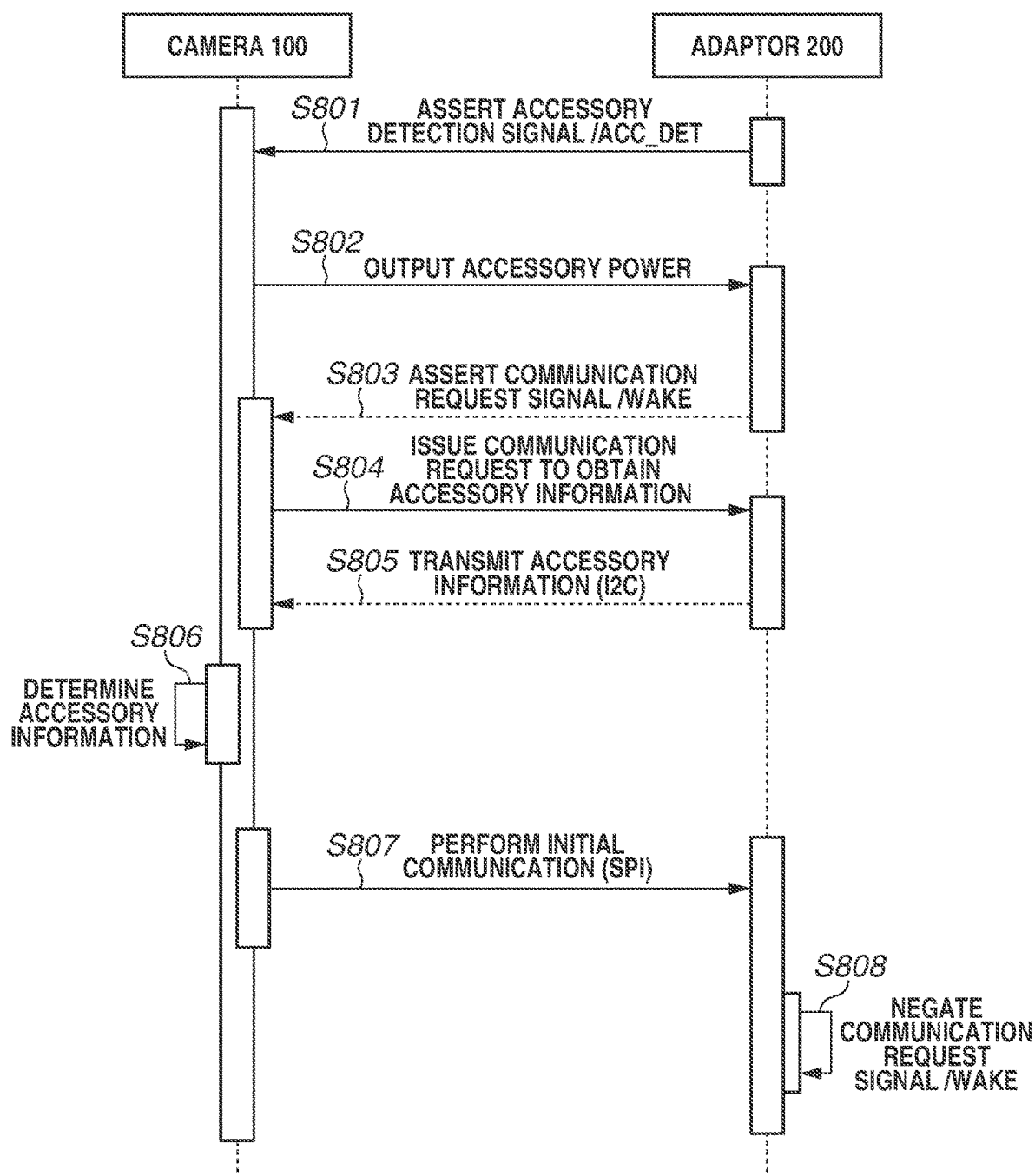

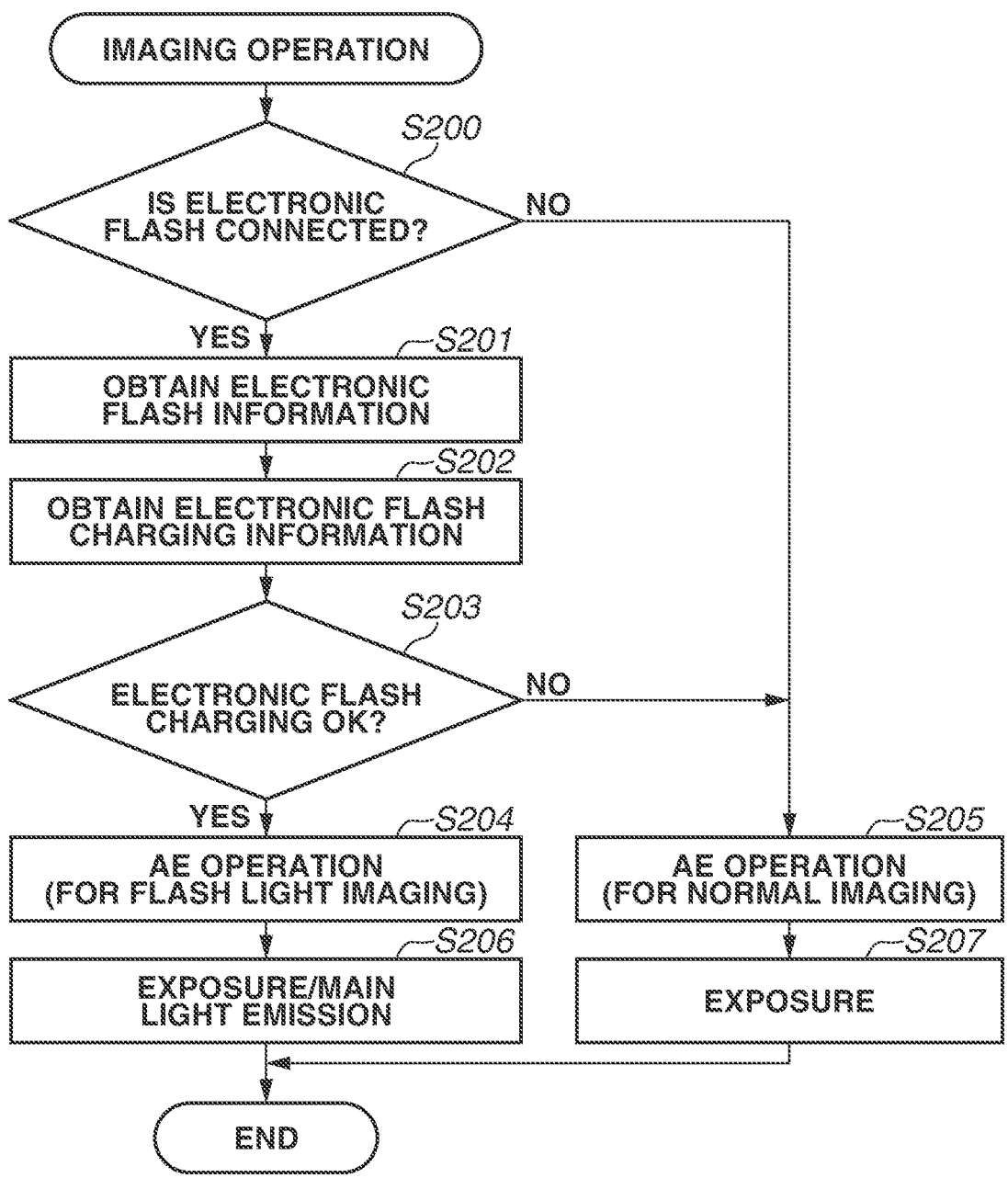

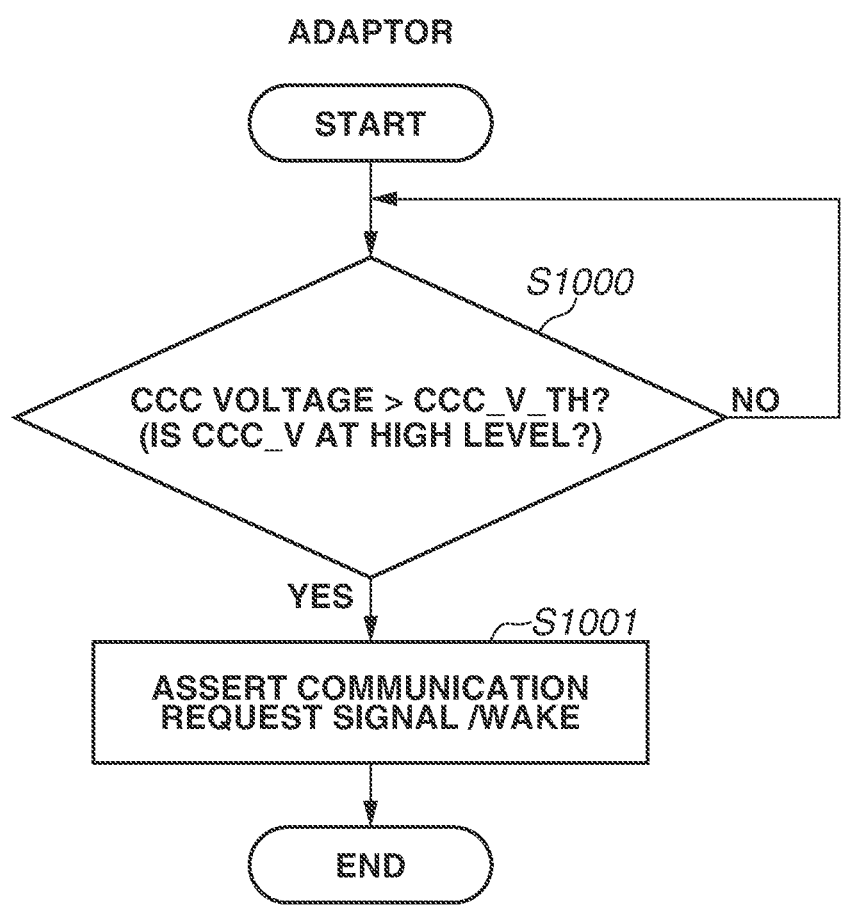

ADAPTOR DEVICE, IMAGING APPARATUS, AND METHOD FOR CONTROLLING SAME

BACKGROUND

Field of the Disclosure

The present disclosure relates to communication between a camera and an accessory to be attached to the camera.

Description of the Related Art

Accessories such as an electronic flash are known to be attached to a camera via an accessory shoe disposed on the camera. Adaptors to be attached between a camera and an accessory such as an electronic flash and relay communication between the camera and the accessory are also known.

Japanese Unexamined Patent Application Publication (Translation of PCT Application) No. 2010-529749 discusses a technique enabling attachment of an electronic flash to an adaptor and wireless control of the electronic flash using the adaptor.

However, Japanese Unexamined Patent Application Publication (Translation of PCT Application) No. 2010-529749 does not take into account the possibility that the camera and the electronic flash may have different configurations for notification or communication.

SUMMARY

Embodiments of the present disclosure are directed to providing an adaptor device, an imaging apparatus, and methods for controlling the same capable of appropriately performing communication even if the camera (imaging apparatus) and an accessory have different configurations for notification or communication.

According to some embodiments of the present disclosure, an adaptor device to be attached between an imaging apparatus and an accessory device includes one or more circuits configured to function as a control unit configured to control communication with the imaging apparatus via a first contact, a second contact, and a third contact, and communication with the accessory device via a fourth contact and a fifth contact. The control unit has a first communication mode in which transmission of data via the fourth contact based on reception of data from the first contact or transmission of data via the second contact based on reception of data via the fifth contact is controlled, and a second communication mode which is different from the first communication mode, and is configured to receive, in the second communication mode, a second command and data via the first contact and then transmit the data via the fourth contact. The control unit is configured to communicate in the first communication mode, based on connection detection communication with the accessory device in the second communication mode and a first command corresponding to an instruction to enter the first communication mode.

According to some embodiments of the present disclosure, an imaging apparatus to which an accessory device is attached via an adaptor device includes one or more circuits configured to function as a control unit configured to control communication with the adaptor device via a first contact, a second contact, and a third contact. The control unit has a first communication mode in which communication with the accessory device via the adaptor device is controlled via the first contact and the second contact, and a second communication mode different from the first communication mode, and is configured to transmit, in the second communication mode, a second command and data via the first contact. The control unit is configured to communicate in the first communication mode based on connection detection communication with the accessory device in the second communication mode and transmission of a first command corresponding to an instruction to enter the first communication mode.

Further features of the present disclosure will become apparent from the following description of exemplary embodiments with reference to the attached drawings.

BRIEF DESCRIPTION OF THE DRAWINGS

FIG. 2 is a diagram illustrating an operation sequence when the adaptor is connected to the camera according to the first exemplary embodiment.

FIG. 3 is a flowchart illustrating an electronic flash imaging operation by the camera according to the first exemplary embodiment.

FIG. 18 is a flowchart illustrating an interrupt operation on the camera by the adaptor according to the second exemplary embodiment.

DESCRIPTION OF THE EMBODIMENTS

Exemplary embodiments of the present disclosure will be described below with reference to the accompanying drawings.

Figure 1A:
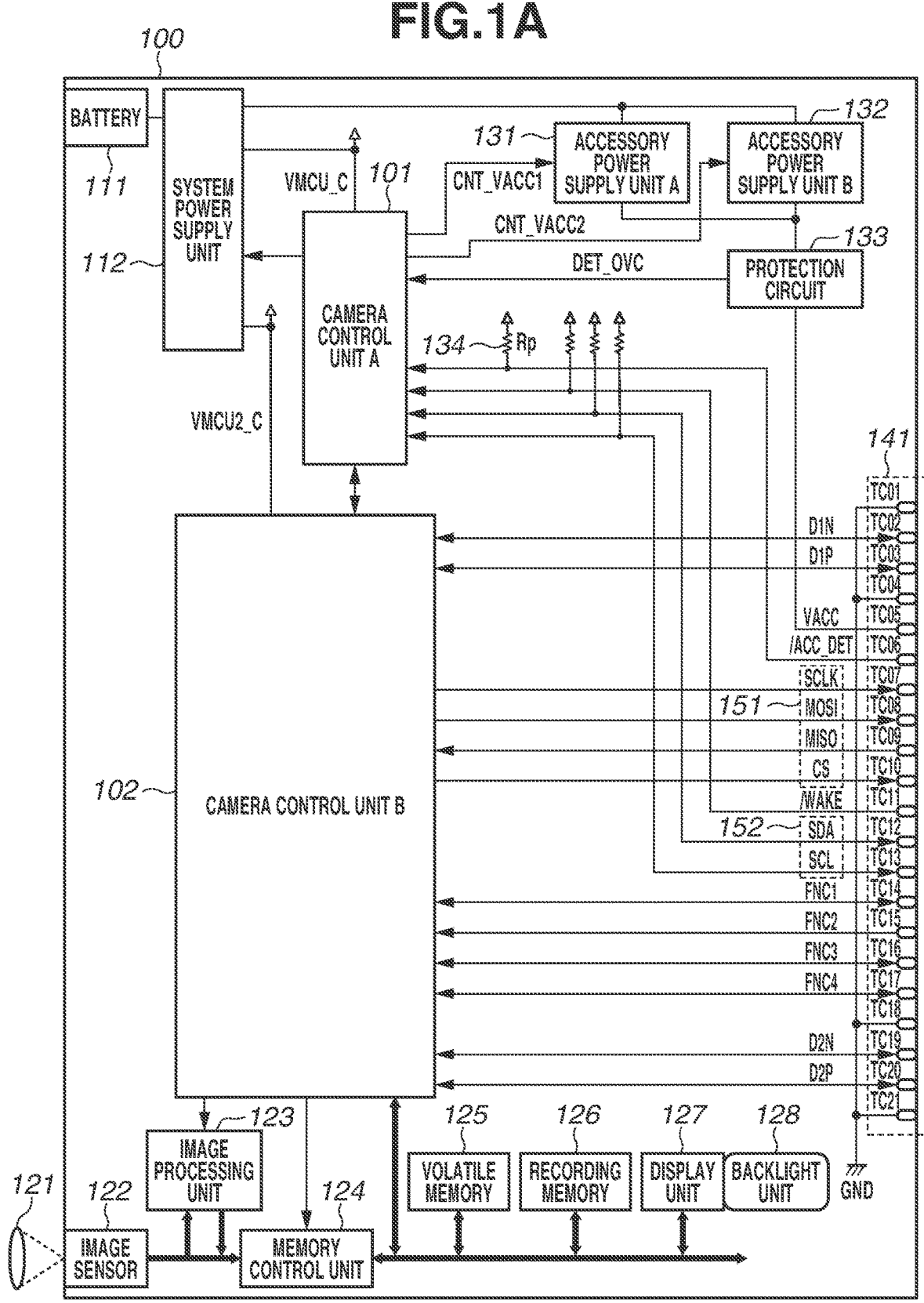
FIGS. 1A, 1B, and 1C are a diagram illustrating a configuration of a camera, an adaptor, and an electronic flash according to a first exemplary embodiment.
Figure 1B:
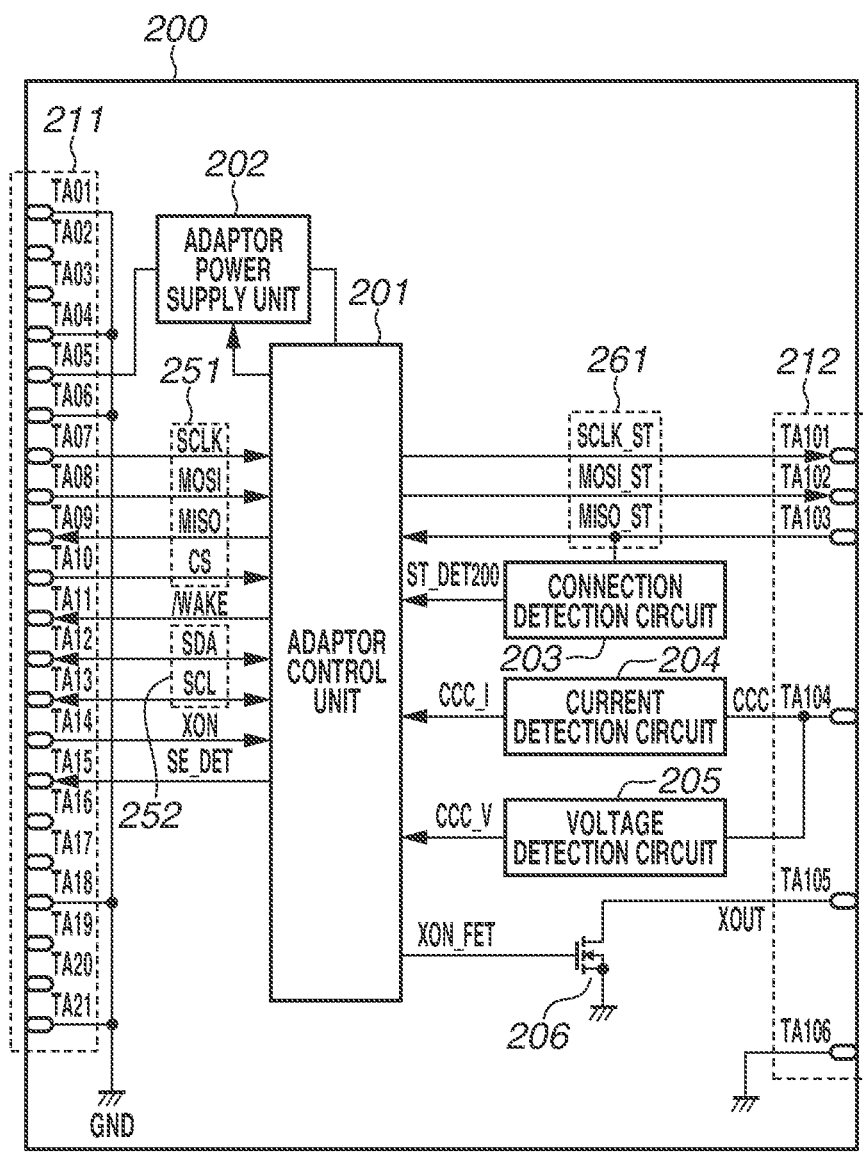
Figure 1C:
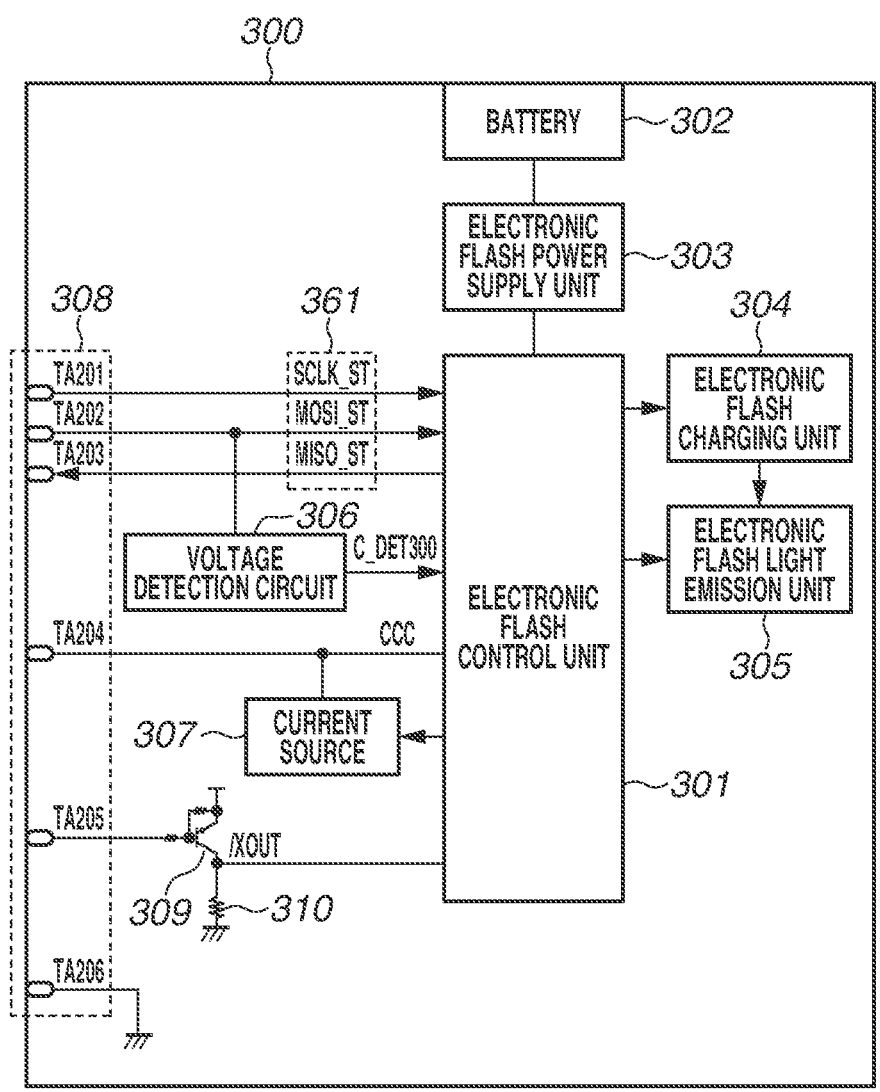

A first exemplary embodiment of the present disclosure will be described below. FIGS. 1A, 1B, and 1C illustrate an electrical configuration of a camera 100 serving as an electronic apparatus that is the first exemplary embodiment of the present disclosure, an adaptor 200 detachably attached thereto, and an electronic device 300 (in the present exemplary embodiment, electronic flash 300) attached to the adaptor 200. The adaptor 200 and the electronic flash 300 are examples of accessories to be attached to the camera 100. The accessories may also be referred to as accessory devices.

In the present exemplary embodiment, an electronic flash is described as an example of the external device 300. However, part or all of the control according to the present exemplary embodiment may be applied to an accessory different from an electronic flash. The electronic flash 300 and the adaptor 200 may also be referred to as accessory devices. An accessory device can include an adaptor if no adaptor is separately defined. An adaptor may be referred to as an intermediate accessory.

<Configuration of Camera 100>

The camera 100 and the adaptor 200 are electrically connected by a plurality of contacts (terminals) TC01 to TC21 of a camera connection unit 141 and a plurality of contacts TA01 to TA21 of an adaptor connection unit 211 making contact on an one-to-one basis.

The camera 100 is powered by a battery 111. The battery 111 is attachable to and detachable from the camera 100. A camera control unit A 101 and a camera control unit B 102 serving as control units of the camera 100 are circuits for controlling the entire camera 100, and include microcomputers with built-in central processing units (CPUs).

The camera control unit A 101 monitors not-illustrated switches for camera operations. The camera control unit A 101 continues to operate even when the camera 100 is in a standby state (low power consumption mode), and controls system power supply based on user operations.

The camera control unit B 102 is in charge of control of an image sensor 122 and a display unit 127. The camera control unit B 102 stops operating when the camera 100 is in the standby state (low power consumption mode).

A system power supply unit 112 is a circuit for generating power to be supplied to various circuits of the camera 100. The system power supply unit 112 includes a direct-current-to-direct-current (DC/DC) converter circuit, a low-dropout (LDO) regulator, and a charge pump circuit. A voltage of 1.8 V generated by the system power supply unit 112 based on power charged from the battery 111 is constantly supplied to the camera control unit A 101 as a camera microcomputer power VMCU_C.

Moreover, a plurality of types of voltages generated by the system power supply unit 112 is supplied to the camera control unit B 102 as camera microcomputer power VMCU2_C at predetermined timing. The camera control unit A 101 controls the system power supply unit 112 to control on and off of the power supply to each of the circuits of the camera 100.

An optical lens 121 is attachable to and detachable from the camera 100. Incident light from an object via the optical lens 121 is formed on the image sensor 122, which includes a complementary metal-oxide-semiconductor (CMOS) sensor or a charge-coupled device (CCD) sensor. The object image formed on the image sensor 122 is encoded into a digital imaging signal.

An image processing unit 123 performs image processing, such as noise reduction processing and white balance processing, on the digital imaging signal to generate image data, and coverts the image data into an image file of Joint Photographic Experts Group (JPEG) format for the sake of recording in a recording memory 126.

The image processing unit 123 also generates video random access memory (VRAM) image data to be displayed on the display unit 127 from the image data.

A memory control unit 124 controls transmission and reception of the image data generated by the image processing unit 123 and other data. A volatile memory 125 is a memory capable of high-speed reading and writing, such as a double data rate 3 synchronous dynamic random access memory (DDR3 SDRAM). The volatile memory 125 is used as a workspace for image processing performed by the image processing unit 123.

The recording memory 126 is a readable and writable recording medium detachably attachable to the camera 100 via a not-illustrated connection unit. Examples include a Secure Digital (SD) card and a CFexpress card.

The display unit 127 is a display disposed on the rear of the camera 100, and includes a liquid crystal display (LCD) panel or an organic electroluminescence (EL) display panel. A backlight unit 128 adjusts the brightness of the display unit 127 by changing the intensity of the backlight to the display unit 127.

An accessory power supply unit A 131 and an accessory power supply unit B 132 serving as power supply units are each a voltage conversion circuit for converting a voltage supplied from the system power supply unit 112 into a predetermined voltage. In the present exemplary embodiment, the accessory power supply units A 131 and B 132 generate 3.3 V as accessory power VACC.

The accessory power supply unit A 131 is a power supply unit including an LDO regulator with low self power consumption. The accessory power supply unit B 132 is a circuit including a DC/DC converter circuit. Higher current can be passed though the accessory power supply unit B 132 than the accessory power supply unit A 131.

The self power consumption of the accessory power supply unit B 132 is higher than that of the accessory power supply unit A 131.

At low load currents, the accessory power supply unit A 131 is thus more efficient than the accessory power supply unit B 132. At high load currents, the accessory power supply unit B 132 is more efficient than the accessory power supply unit A 131.

The camera control unit A 101 controls the voltage outputs of the accessory power supply units A 131 and B 132 on and off based on an operation state of the adaptor 200.

A protection circuit 133 serving as a protection unit includes a current fuse element, a polyswitch, or an electronic fuse circuit combining a resistor, an amplifier, and a switch element. The protection circuit 133 outputs an overcurrent detection signal DET_OVC if the value of a power supply current supplied from the accessory power supply units A 131 and B 132 to the adaptor 200 exceeds a predetermined value, i.e., is excessive (abnormal).

In the present exemplary embodiment, the protection circuit 133 is an electronic fuse circuit. If a current of 1 A or more flows, the protection circuit 133 issues a notification to the camera control unit A 101 using the overcurrent detection signal DET_OVC. The overcurrent detection signal DET_OVC indicates an overcurrent with a high level.

The camera connection unit 141 is a connector for establishing electrical connection with the adaptor 200 via the 21 contacts TC01 to TC21 arranged in a row. The contacts TC01 to TC21 are arranged in this order from one end to the other in the arrangement direction.

The contact TC01 is connected to a ground (GND). The contact TC01 functions not only as a reference potential contact but also as a contact for controlling the wiring impedance of a differential signal D1N and a differential signal D1P.

The differential signal D1N connected to the contact TC02 and the differential signal D1P connected to the contact TC03 are a pair of difference data communication signals for performing data communication, and connected to the camera control unit B 102. The contacts TC02 and TC03 and the contacts TC07 to TC17, TC19, and TC20 to be described below are communication contacts.

The contact TC04 is connected the GND, and serves as a reference potential contact between the camera 100 and the adaptor 200. The contact TC04 is located outside the contact TC05 to be described below in the arrangement direction of the contacts.

The contact TC05 serving as a power supply contact is connected to the accessory power VACC generated by the accessory power supply units A 131 and B 132 via the protection circuit 133.

The contact TC06 serving as an attachment detection contact is connected to an accessory attachment detection signal /ACC_DET. The accessory attachment detection signal /ACC_DET is pulled up to the camera microcomputer power VMCU_C via a resistive element Rp 134 (10 kΩ).

The camera control unit A 101 can detect whether the adaptor 200 is attached by reading the signal level of the accessory attachment detection signal /ACC_DET.

If the signal level (potential) of the accessory attachment detection signal /ACC_DET is a high level (predetermined potential), the adaptor 200 is detected to not be attached. If the signal level (potential) is a low level (as will be described below, GND potential), the adaptor 200 is detected to be attached.

A signal line SCLK connected to the contact TC07, a signal line MOSI connected to the contact TC08, a signal line MISO connected to the contact TC09, and a signal line CS connected to the contact TC10 are signal lines through which signals for performing a serial peripheral interface (SPI) communication with the camera control unit B 102 which serves as the communication master are communicated. Here, signals SCLK, MOSI, MISO, and CS are signals communicated through the signal lines SCLK, MOSI, MISO, and CS, respectively. If the signal CS is asserted, the SPI communication is enabled. In the present exemplary embodiment, the low level of the CS signal is regarded as the assertion level. However, the high level may serve as the assertion level. The camera control unit B 102 transmits data via the signal line MOSI, and an adaptor control unit 201 transmits data via the signal line MISO, in synchronization with a clock signal transmitted from the camera control unit B 102 via the signal line SCLK. The present exemplary embodiment will be described by using a case where the data communicated here is 8-bit data as an example. The signals SCLK, MOSI, MISO, and CS that the camera control unit B 102 uses for communication will also be referred to as serial communication signals 151.

The contact TC11 is connected with a communication request signal /WAKE for the adaptor 200 to request communication from the camera control unit A 101.

The communication request signal /WAKE is pulled up to the camera microcomputer power VMCU_C via a resistor. The camera control unit A 101 can receive the communication request from the adaptor 200 by detecting a falling edge (assertion) of the communication request signal /WAKE.

A signal SDA connected to the contact TC12 and a signal SCL connected to the contact TC13 are signals for performing an Inter-Integrated Circuit (I2C) communication with the camera control unit A 101 serving as the communication master. The signals SDA and SCL that the camera control unit A 101 uses for communication will also be referred to as serial communication signals 152.

The signals SDA and SCL are pulled up to the camera microcomputer power VMCU_C for open-drain communication. In the present exemplary embodiment, the communication frequency is 100 kbps.

A signal FNC1 connected to the contact TC14, a signal FNC2 connected to the contact TC15, a signal FNC3 connected to the contact TC16, and a signal FNC4 connected to the contact TC17 are functional signals of which functions can be changed based on the type of accessory attached.

The contact TC18 is connected to the GND. As with the contact TC04, the contact TC18 serves as a reference potential contact between the camera 100 and the adaptor 200.

A differential signal D2N connected to the contact TC19 and a differential signal D2P connected to the contact TC20 are a pair of data communication signals for performing data communication. The differential signals D2N and D2P are connected to the camera control unit B 102.

The contact TC21 is connected to the GND. The contact TC21 functions not only as a reference potential contact but also as a contact for controlling the wiring impedance of the differential signals D2N and D2P.

<Configuration of Adaptor 200>

The adaptor control unit 201 serving as a control unit of the adaptor 200 is a circuit for receiving commands from the camera 100 and controlling the entire adaptor 200. The adaptor control unit 201 may include a microcomputer including a CPU.

The adaptor control unit 201 has a level shift function of shifting the voltage levels of the output voltages of the camera 100 and the electronic flash 300 to ones receivable by the intended receiving devices so that the camera 100 and the electronic flash 300 can communicate with each other. The adaptor control unit 201 also has a function of detecting the state of the electronic flash 300 and converting the state into a state determinable by the camera 100. Details of such functions will be described below.

An adaptor power supply unit 202 is a circuit for generating power to be supplied to various components of the adaptor 200. A voltage generated by the adaptor power supply unit 202 is supplied to the adaptor control unit 201. The power supply to various circuits of the adaptor 200 is controlled on and off by controlling the adaptor power supply unit 202.

In the present exemplary embodiment, the adaptor 200 runs only with the power supplied from the camera 100.

The adaptor connection unit 211 is used for establishing electrical connection with the camera 100 via the 21 contacts TA01 to TA21 arranged in a row. The contacts TA01 to TA21 are arranged in this order from one end to the other in the arrangement direction.

The contact TA01 is connected to the GND.

The contacts TA02 and TA03, in the present exemplary embodiment, have no electrical connection inside the adaptor 200.

The contact TA04 is connected to the GND, and serves as a reference potential contact between the camera 100 and the adaptor 200. The contact TA04 is located outside the contact TA05 to be described below in the arrangement direction of the contacts.

The contact TA05 serving as a power supply contact is connected to the adaptor power supply unit 202. The accessory power VACC to be supplied from the camera 100 is connected to the contact TA05.

The contact TA06 serving as an attachment detection contact is directly connected to the GND. When the adaptor 200 is attached to the camera 100, the contact TA06 functions as a contact for causing the camera 100 to detect the attachment of the adaptor 200 by setting the foregoing accessory attachment detection signal /ACC_DET to the GND level (GND potential) that is the low level.

The signal SCLK connected to the TA07, the signal MOSI connected to the contact TA08, the signal MISO connected to the TA09, and the signal CS connected to the contact TA10 are used for performing an SPI communication with the adaptor control unit 201 serving as the communication slave. The signals SCLK, MOSI, MISO, and CS that the adaptor control unit 201 uses for communication will also be referred to as serial communication signals 251.

The contact TA11 is connected to the communication request signal /WAKE for the adaptor control unit 201 to request communication from the camera 100. If the adaptor control unit 201 determines to communicate with the camera 100, the adaptor control unit 201 issues a communication request to the camera 100 by outputting the communication request signal /WAKE of the low level (asserting the communication request signal /WAKE).

The signal SDA connected to the contact TA12 and the signal SCL connected to the contact TA13 are used for performing an I2C communication with the adaptor control unit 201 serving as the communication slave. The signals SDA and SCL that the adaptor control unit 201 uses for communication will also be referred to as serial communication signals 252.

The signal FNC1 connected to the contact TA14 and the signal FNC2 connected to the contact TA15 are connected to the adaptor control unit 201 serving as signals XON and ST_DET in the adaptor 200, respectively. These functional signals will be described below.

The contacts TA16 and TA17 are ones for transmitting the signals FNC3 and FNC4, respectively. In the present exemplary embodiment, the contacts TA16 and TA17 will be described to have no electrical connection inside the adaptor 200. The contacts TA16 and TA17 themselves may be omitted.

The contact TA18 is connected to the GND. As with the contact TA04, the contact TA18 serves as a reference potential contact between the camera 100 and the adaptor 200.

The contacts TA19 and TA20 are terminals for transmitting differential signals. In the present exemplary embodiment, the contacts TA19 and TA20 will be described to have no electrical connection inside the adaptor 200. The contacts TA19 and TA20 themselves may be omitted.

The contact TA21 is connected to the GND.

An external device connection unit 212 is a connector terminal for connecting to the external device 300, and is also referred to as an adaptor connection unit 212. The present exemplary embodiment deals with an example where the external device 300 is an electronic flash.

A signal line SCLK_ST connected to a contact TA101, a signal line MOSI_ST connected to a contact TA102, and a signal line MISO_ST connected to a contact TA103 are signal lines through which signals for performing an SPI communication with the camera control unit B 102 serving as the communication master are communicated. Here, signals SCLK_ST, MOSI_ST, and MISO_ST are signals communicated through the signal lines SCLK_ST, MOSI_ST, and MISO_ST, respectively. The adaptor control unit 201 transmits data via the signal line MOSI_ST, and the electronic flash control unit 301 transmits data via the signal line MISO_ST, in synchronization with a clock signal transmitted from the adaptor control unit 201 the signal line SCLK_ST. The present exemplary embodiment is described by using a case where the data communicated here is 8-bit data as an example.

The signals SCLK_ST, MOSI_ST, and MISO_ST that the adaptor control unit 201 uses for communication will also be referred to as serial communication signals 261.

A connection detection circuit 203 is a circuit for detecting the connection of the external device 300 to the external device connection unit 212. The adaptor control unit 201 can detect the connection of the external device 300 to the external device connection unit 212 by receiving the output signal of the connection detection circuit 203.

A contact TA104 is a terminal for detecting the state of the electronic flash 300 using a signal CCC connected thereto.

A current detection circuit 204 detects a synchronized current of the electronic flash 300, and outputs a detection state signal CCC_I to the adaptor control unit 201. Details will be described below.

A voltage detection circuit 205 detects a voltage output by the electronic flash 300, and outputs a detection state signal CCC_V to the adaptor control unit 201. Details will be described below.

A contact TA105 communicates a light emission trigger signal XOUT for triggering the electronic flash 300 to emit light, and is connected to the drain of a field effect transistor (FET) 206. The FET 206 is switched based on a signal XON_FET from the adaptor control unit 201.

A contact TA106 is connected the GND.

<Configuration of Electronic Flash 300>

The electronic flash 300 is connected to the adaptor 200 via an electronic flash connection unit 308.

An electronic flash control unit 301 controls various components in the electronic flash 300 based on control from the camera 100 and user operations, received via the adaptor 200.

The electronic flash 300 includes a battery 302. An electronic flash power supply unit 303 connected to the battery 302 generates power to be supplied to various components in the electronic flash 300.

An electronic flash charging unit 304 is charged with a voltage for the electronic flash 300 to emit light.

An electronic flash light emission unit 305 emits light using the voltage with which the electronic flash charging unit 304 is charged.

A voltage detection circuit 306 detects the voltage level of the signal MOSI_ST output from the adaptor 200, and outputs the detected state to the electronic flash control unit 301. Details will be described below.

A current source 307 has a function of notifying the adaptor 200 of the charging state of the electronic flash charging unit 304. If the electronic flash charging unit 304 is detected to be in a charging state capable of light emission, the electronic flash control unit 301 controls the current source 307 to perform synchronization control on a predetermined current.

The signal XOUT from the adaptor 200 is connected to the base of a transistor 309. If the FET 206 turns on, the transistor 309 turns on to output a signal /XOUT=H to the electronic flash control unit 301.

<Communication Between Camera 100 and Adaptor 200>

FIG. 2 illustrates an operation sequence according to the present exemplary embodiment.

In step S801, the adaptor 200 is connected to the camera 100. The accessory detection signal /ACC_DET is asserted, and the camera 100 detects that the adaptor 200 is attached.

In step S802, the camera 100 starts outputting the accessory power VACC.

In step S803, the adaptor 200 asserts the communication request signal /WAKE to notify the camera 100 of communication permission.

In step S804, to obtain accessory information about the adaptor 200, the camera 100 issues a communication request using the serial communication signals 152.

In step S805, the adaptor 200 transmits the accessory information to the camera 100 using the serial communication signals 252.

The accessory information includes information indicating that the adaptor 200 is an adaptor accessory for using the electronic flash 300, and that the signals FNC1 and FNC2 are used for electronic flash control. The operation of the signals FNC1 and FNC2 will be described below.

In step S806, the camera 100 determines the accessory information, and determines that the connected adaptor 200 is a relay accessory for using the electronic flash 300.

In step S807, the camera 100 performs initial communication for communicating with the electronic flash 300 with the adaptor 200, using the serial communication signals 151. The initial communication includes commands for making power supply settings of various blocks for the adaptor control unit 201 to detect the attachment of the electronic flash 300.

In step S808, the adaptor 200 negates the communication request signal /WAKE. The adaptor 200 transitions to a state of waiting for a communication request from the electronic flash 300.

<Flowchart for Describing Operation of Camera 100>

An operation of the camera 100 according to the first exemplary embodiment of the present disclosure will be described below with reference to FIG. 3. FIG. 3 is a flowchart illustrating an example of electronic flash imaging. The operations in each step described below are performed by the camera control unit B 102 as appropriate. For example, the operation of the camera 100 is controlled by execution of a program stored in a not-illustrated memory inside the CPU included in the camera control unit B 102.

In step S200, the camera control unit B 102 determines whether the electronic flash 300 is connected via the adaptor 200.

If the electronic flash 300 is not connected (NO in step S200), the processing proceeds to step S205.

If the electronic flash 300 is connected (YES in step S200), the processing proceeds to step S201. In step S201, the camera control unit B 102 obtains electronic flash information from the electronic flash 300 via the adaptor 200. The electronic flash information obtained here includes information to be used in electronic flash imaging. Examples of the information include a light emission mode set in the electronic flash 300 and emission amount information.

The determination of the electronic flash connection in step S200 and the obtaining of the electronic flash information in step S201 will be described below with reference to FIG. 4.

In step S202, the camera control unit B 102 obtains electronic flash charging information from the electronic flash 300.

In step S203, the camera control unit B 102 determines the charging state of the electronic flash 300 based on the obtained electronic flash charging information.

Figure 5:
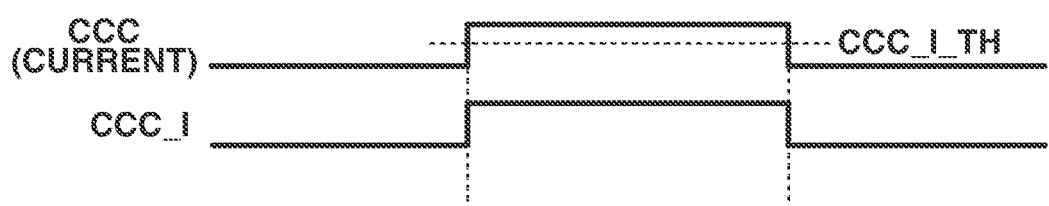
FIG. 5 is a diagram illustrating an operation of the electronic flash and the adaptor based on a charging state of the electronic flash according to the first exemplary embodiment.

An operation of the electronic flash 300 and the adaptor 200 based on the charging state of the electronic flash 300 will be described below with reference to FIG. 5.

If it is determined that the electronic flash 300 has been charged, i.e., "electronic flash charging OK" (YES in step S203), the processing proceeds to step S204. If, in step S203, it is determined that the electronic flash 300 has not been charged, i.e., not "electronic flash charging OK" (NO in step S203), the processing proceeds to step S205.

In steps S204 and S205, the camera control unit B 102 controls an automatic exposure (AE) operation. The AE operation refers to processing for calculating the luminance of an object area from the signal obtained from the image sensor 122 and determining exposure parameters for imaging. The exposure parameters include an International Organization for Standardization (ISO) speed, a shutter speed, and a lens aperture value. A difference between steps S204 and S205 is whether the exposure parameters are determined for situations where the electronic flash 300 emits light. In step S204, the camera control unit B 102 determines the exposure parameters for situations where the electronic flash 300 emits light.

On the other hand, in step S205, the camera control unit B 102 determines the exposure parameters for situations where the electronic flash 300 does not emit light.

For example, in step S204, the camera control unit B 102 sets the upper limit value of the ISO speed to one lower than the ISO speed determined in step S205, in view of the possibility that the captured image can be overexposed (the image sensor 122 can be saturated) by the light emitted from the electronic flash 300.

In step S206, the camera control unit B 102 controls the electronic flash 300 to emit light and performs an exposure operation. The light emission operation by the electronic flash 300 will be described below with reference to FIG. 7.

In step S207, the camera control unit B 102 performs an exposure operation without causing the electronic flash 300 to emit light.

<Detection of Attachment of Electronic Flash 300 Via Adaptor 200 and Associated Communication>

The determination of the electronic flash connection and the obtaining of the electronic flash information in steps S200 and S201 and a communication operation with the electronic flash 300 will be described with reference to FIG. 4. The electronic flash information includes model determination information about the electronic flash 300 and setting information about the electronic flash 300.

The camera 100 initially transmits command 1 for the adaptor 200 using the serial communication signals 151 (time T30). Command 1 for the adaptor 200 is used for activating the serial communication signals 261 of the adaptor 200. The adaptor control unit 201 receives command 1 for the adaptor 200, and sets the voltage levels of the signals SCLK_ST and MOSI_ST to a level VSTH (time T31).

The voltage detection circuit 306 in the electronic flash 300 detects that the voltage level of the signal MOSI_ST is higher than a threshold Vth_ST2, and asserts an internal signal C_DET300. If the internal signal C_DET300 is asserted, the electronic flash control unit 301 determines that the camera 100 is connected, and sets the voltage level of the signal MISO_ST to a level VSTL (time T32).

The connection detection circuit 203 in the adaptor 200 detects that the voltage level of the signal MISO_ST is higher than a threshold Vth_ST3, and asserts an internal signal ST_DET200 (time T32).

If the internal signal ST_DET200 is asserted, the adaptor control unit 201 determines that the electronic flash 300 is connected, and asserts the signal ST_DET (FNC2). The adaptor control unit 201 thereby notifies the camera 100 that the electronic flash 300 is connected.

Through the foregoing processing, the camera control unit B 102 detects that the electronic flash 300 is connected. Such a communication for connection detection will also be referred to as connection detection communication. The adaptor 200 thus converts electronic flash connection detection information based on the output voltage level of the electronic flash 300 into a digital signal, which excludes the need for the camera 100 to include a mechanism for detecting analog information.

The camera 100 detects the connection of the electronic flash 300, and transmits command 2 for the adaptor 200 using the serial communication signals 151 to control the electronic flash 300 (time T33). The adaptor 200 receives command 2 for the adaptor 200, and enters a mode (electronic flash communication mode) for shifting the voltage levels of the output voltages of the camera 100 and the electronic flash 300 into ones receivable by the intended receiving devices and outputting the resulting output voltages so that the camera 100 and the electronic flash 300 can communicate with each other. Thus, command 2 for the adaptor 200 corresponds to an instruction to enter the electronic flash communication mode.

The high levels of the signals SCLK_ST, MOSI_ST, and MISO_ST are the level VSTH, and the low levels the level VSTL. The threshold between the high and low levels is Vth_ST1. The level VSTL is higher than the thresholds Vth_ST2 and Vth_ST3. The adaptor 200 and the electronic flash 300 can thus detect each other's connections even when the signals MOSI_ST and MISO_ST are at the level VSTL.

When not in communication (signal SCLK_ST is fixed at the high level), the electronic flash 300 is in a communicable state if the signal MISO_ST is at the level VSTH, and in an incommunicable (busy) state if the signal MISO_ST is at the level VSTL.

Figure 4:
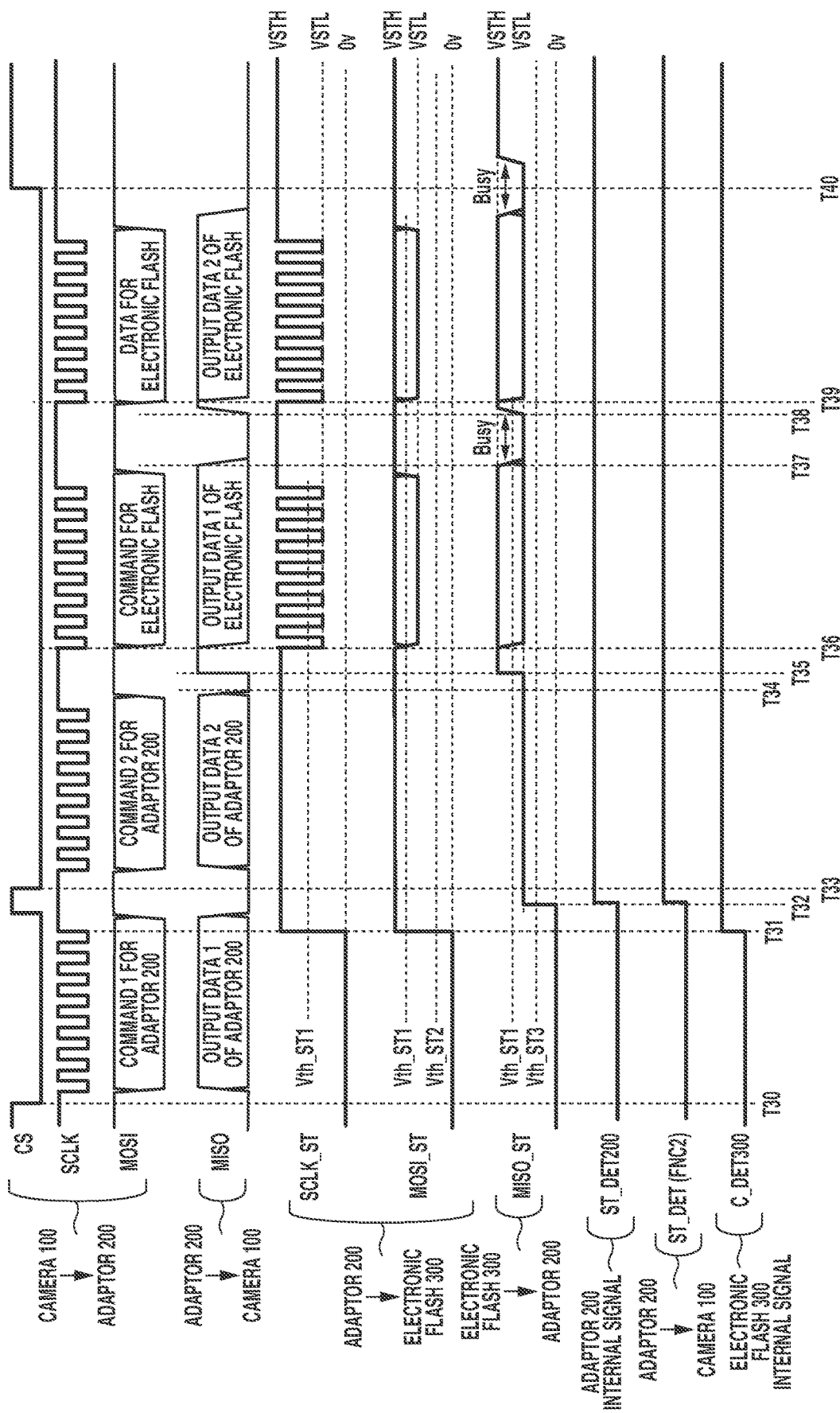
FIG. 4 is a timing chart illustrating communication between the camera, the adaptor, and the electronic flash according to the first exemplary embodiment.

At time T35 of FIG. 4, the electronic flash 300 finishes internal initialization related to the attachment of the camera 100, enters a state capable of communication with the camera 100, and sets the signal MISO_ST to the level VSTH. With the signal MISO_ST changed to the level VSTH, the adaptor 200 changes the signal MISO to the high level. The camera 100 detects that the electronic flash 300 has exited the busy state in response to the change of the signal MISO to the high level. At time T36, the camera 100 starts to communicate with the electronic flash 300. At time T37, to analyze the received communication, the electronic flash control unit 301 sets the signal MISO_ST to the level VSTL to notify the camera 100 of the busy state. At times T38 and T39, the camera 100 detects that the electronic flash 300 has exited the busy state again, and starts the next communication.

The camera 100 performs a series of communications for controlling the electronic flash 300, and negates the signal CS (time T40). With the signal CS negated, the adaptor control unit 201 cancels the electronic flash communication mode. The voltage levels of the signals SCLK_ST and MOSI_ST are set to the level VSTH regardless of the states of the signals SCLK and MOSI. The output signal MISO is set to the low level regardless of the state of the signal MISO_ST.

<Transmission of Electronic Flash Charging State>

The operation where the adaptor control unit 201 detects the charging state of the electronic flash 300 will be described with reference to FIG. 5.

The electronic flash control unit 301 detects that the electronic flash charging unit 304 is in a charging state capable of light emission, and controls the current source 307 to perform a synchronization control on a predetermined current. The current detection circuit 204 detects that the synchronized current of the electronic flash 300 is higher than a predetermined current threshold CCC_I_TH, and sets the detection state signal CCC_I to the high level.

The camera 100 communicates with the adaptor 200 using the serial communication signals 151 to check the charging state of the electronic flash 300 at a predetermined timing such as the timing of light emission control. The adaptor control unit 201 receives communication for checking the charging state of the electronic flash 300, and transmits the detection state signal CCC_I to the camera 100.

<Transmission of Communication Request from Electronic Flash>

Figure 6:
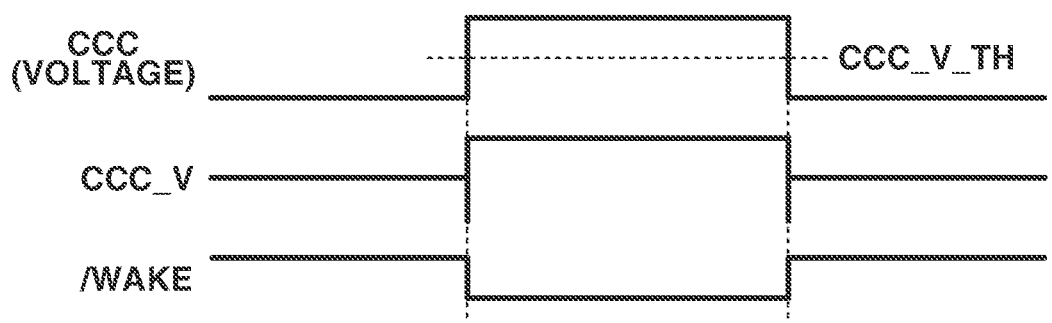
FIG. 6 is a diagram illustrating an interrupt signal from the electronic flash to the camera according to the first exemplary embodiment.

The operation for notifying the camera 100 of a communication request from the electronic flash 300 via the adaptor 200 will be described with reference to FIG. 6.

In requesting communication from the camera 100, the electronic flash control unit 301 applies a predetermined voltage to the terminal CCC (contact TA204). The voltage detection circuit 205 detects that the voltage is higher than a predetermined voltage threshold CCC_V_TH, and sets the detection state signal CCC_V to the high level. The adaptor control unit 201 detects that the detection state signal CCC_V is at the high level, and asserts the communication request signal /WAKE as an interrupt signal output to the camera 100.

The camera 100 starts to communicate with the electronic flash control unit 301 by an interrupt operation with the communication request signal /WAKE.

Figure 7:
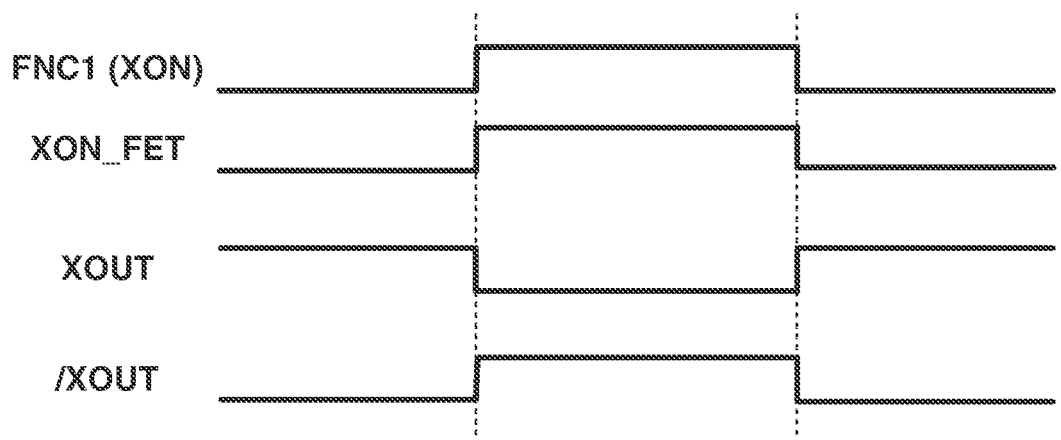
FIG. 7 is a diagram illustrating light emission control of the electronic flash by the camera according to the first exemplary embodiment.

The control of the X signals (XON, XON_FET, XOUT, and /XOUT) for electronic flash light emission will be described with reference to FIG. 7.

To cause the electronic flash 300 to emit light, the camera 100 asserts the signal FNC1 (XON).

With the signal XON asserted, the adaptor control unit 201 sets the signal XON_FET to the high level to turn the FET 206 on, thus setting the signal XOUT to the low level. The low level of the signal XOUT turns on the transistor 309 of the electronic flash 300, and the signal /XOUT becomes the high level. The electronic flash control unit 301 detects that the signal /XOUT is at the high level, and starts a predetermined light emission operation.

As described above, according to the present exemplary embodiment, the camera 100 and the accessory (including electronic flash 300) can communicate appropriately even if their configurations for notification and communication are different.

Since the adaptor 200 has a mode to shift the levels of the communication signals between the camera 100 and the electronic flash 300 and a mode to output the terminal states of the electronic flash 300 to the camera 100 by communication, the camera 100 can obtain various types of electronic flash information.

A second exemplary embodiment of the present disclosure will now be described. In the second exemplary embodiment, an automatic light amount control mode shall be set. In the automatic light amount control mode, preliminary light emission is performed on an object. The light reflected from the object is received by an image sensor 122, the appropriate amount of light emission (amount of main light emission) for actual imaging is calculated based on a result of the light reception, and imaging (exposure) is performed with appropriate exposure. A camera 100, an adaptor 200, and an electronic flash 300 have a configuration similar to that described in conjunction with FIGS. 1A, 1B, and 1C. The operation when the adaptor 200 is connected to the camera 100 is similar to that described in conjunction with FIG. 2.

Figure 8:
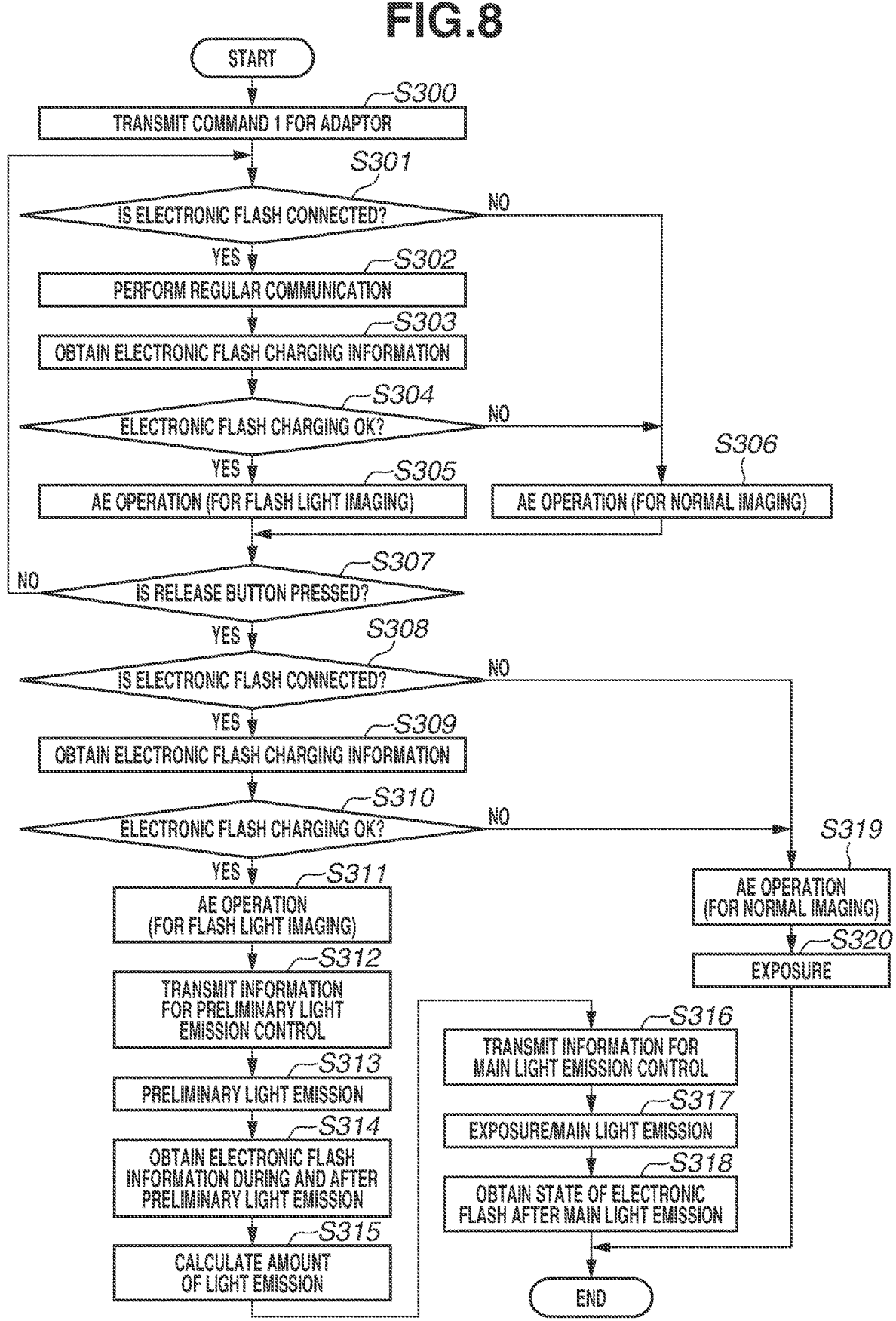
FIG. 8 is a flowchart illustrating an electronic flash imaging operation according to a second exemplary embodiment.

FIG. 8 is a flowchart for describing electronic flash imaging in the automatic light amount control mode.

As in the first exemplary embodiment, communication with the electronic flash 300 via the adaptor 200 will be described with reference to FIG. 4 as well.

In step S300, the camera 100 transmits command 1 for the adaptor 200 using the serial communication signals 151 (FIG. 4: time T30).

Command 1 for the adaptor 200 is a command for activating the serial communication signals 261 of the adaptor 200.

An adaptor control unit 201 receives command 1 for the adaptor 200, and sets the voltage levels of the signals SCLK_ST and MOSI_ST to the level VSTH (FIG. 4: time T31).

Figure 9:
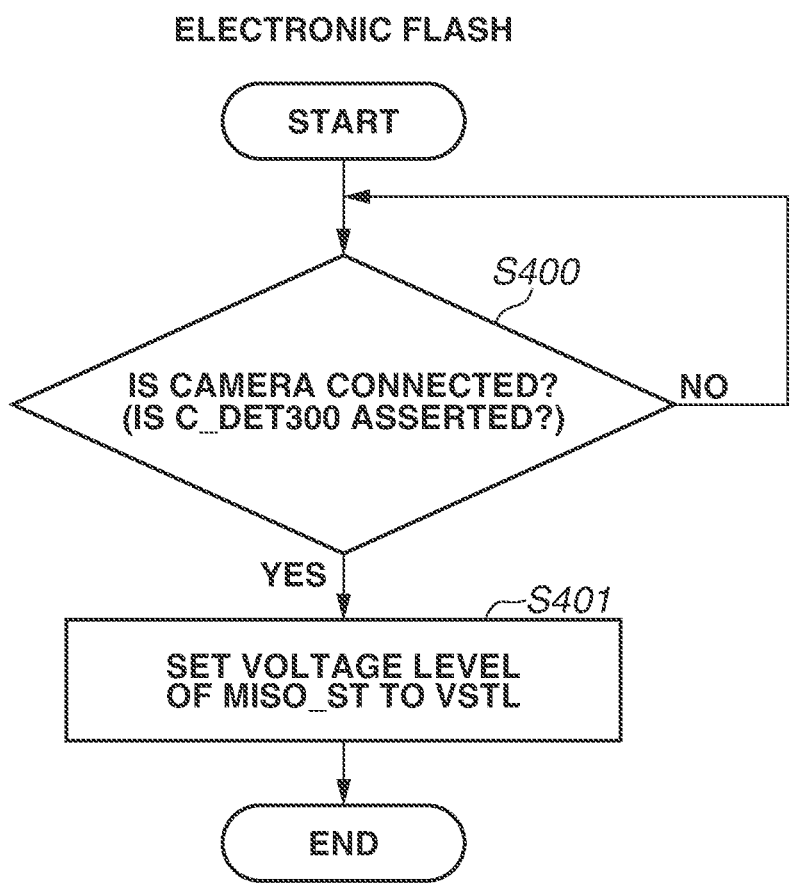
FIG. 9 is a flowchart illustrating a camera connection detection operation by an electronic flash according to the second exemplary embodiment.

At time T31, the voltage detection circuit 306 in the electronic flash 300 detects that the voltage level of the signal MOSI_ST is higher than the threshold Vth_ST2, and asserts the internal signal C_DET300. FIG. 9 illustrates a control flowchart of the electronic flash 300 here.

In step S400 of FIG. 9, if the electronic flash control unit 301 detects that the internal signal C_DET300 is asserted, the electronic flash control unit 301 determines that the camera 100 is connected (YES in step S400), and the processing proceeds to step S401.

In step S401, the electronic flash control unit 301 sets the voltage level of the signal MISO_ST to the level VSTL (FIG. 4: time T32).

Figure 10:
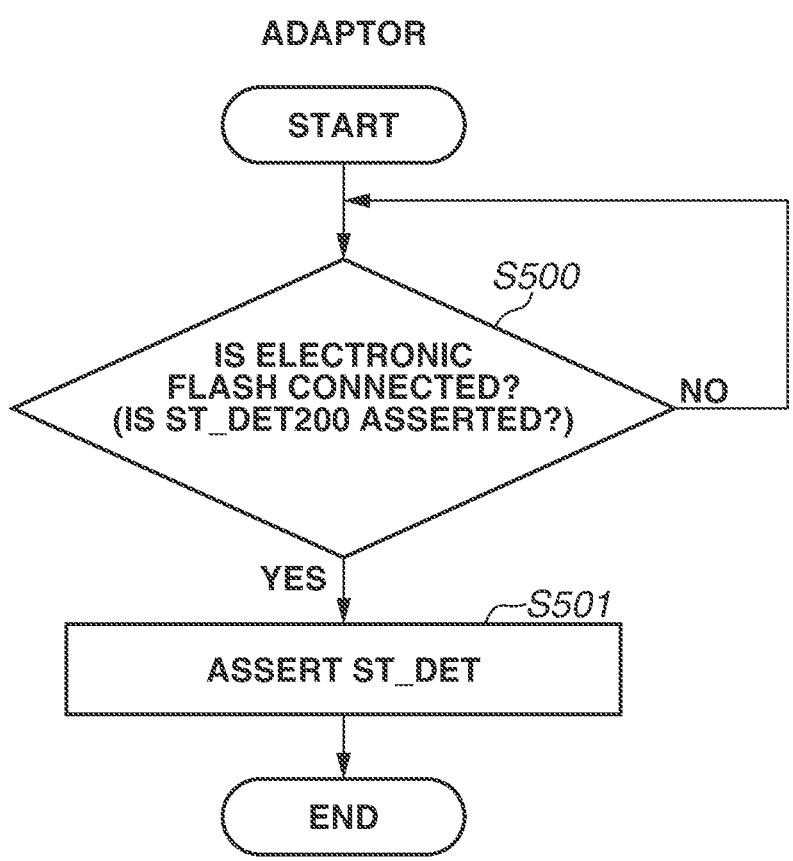
FIG. 10 is a flowchart illustrating an electronic flash connection detection operation by an adaptor according to the second exemplary embodiment.

At time T32, the connection detection circuit 203 in the adaptor 200 detects that the voltage level of the signal MISO_ST is higher than the threshold Vth_ST3, and asserts the internal signal ST_DET200. FIG. 10 illustrates a control flowchart of the adaptor 200 here.

In step S500 of FIG. 10, if the adaptor control unit 201 detects that the signal ST_DET200 is asserted, the adaptor control unit 201 determines that the electronic flash 300 is connected (YES in step S500), and the processing proceeds to step S501.

In step S501, the adaptor control unit 201 asserts the signal ST_DET (FNC2) to notify the camera 100 that the electronic flash 300 is connected.

In step S301, if the camera 100 detects that the electronic flash 300 is connected by the assertion of the signal ST_DET (FNC2) (YES in step S301), the processing proceeds to step S302. On the other hand, if the signal ST_DET (FNC2) is not asserted and the electronic flash is determined to not be connected (NO in step S301), the processing proceeds to step S306. In step S306, as described in conjunction with step S205 of FIG. 3, the camera 100 determines the exposure parameters for situations where the electronic flash 300 does not emit light.

In step S302, the camera 100 performs regular communication with the electronic flash 300 via the adaptor 200. The regular communication refers to communication for transmitting setting information about the camera 100 to the electronic flash 300 and receiving setting information about the electronic flash 300. The communication operation is similar to the operation from time T33 to time T40 in FIG. 4 described above. When the regular communication is completed, the processing proceeds to step S303.

In step S303, the camera 100 obtains electronic flash charging information.

Figure 11:
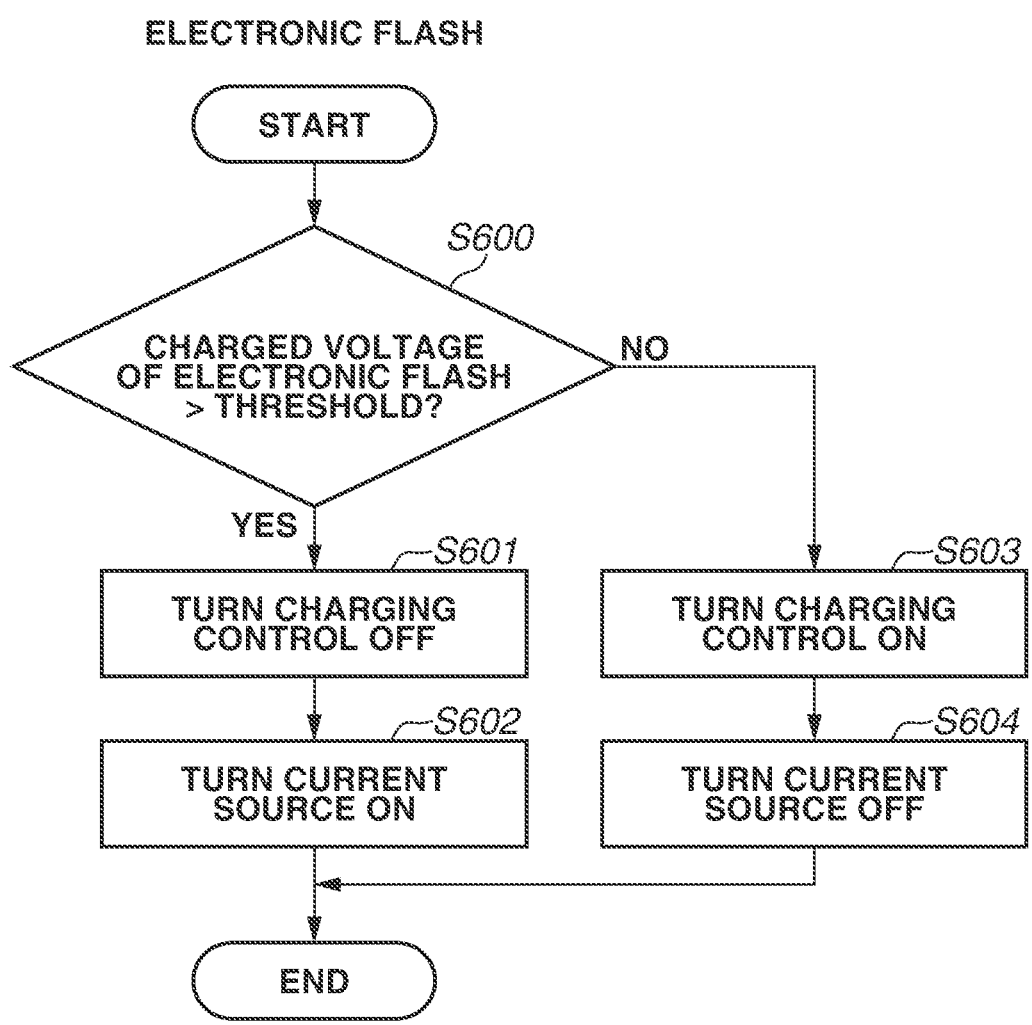
FIG. 11 is a flowchart illustrating a charging voltage detection operation by the electronic flash according to the second exemplary embodiment.
Figure 12:
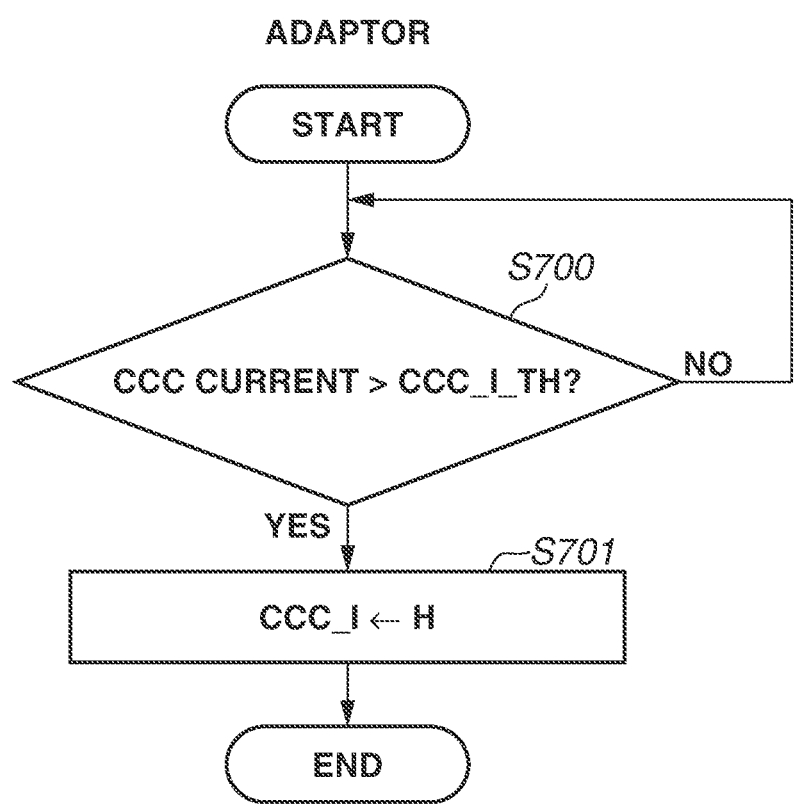
FIG. 12 is a flowchart illustrating an operation when the adaptor obtains the charging state of the electronic flash according to the second exemplary embodiment.

FIG. 11 is a flowchart when the electronic flash 300 monitors the charging state.

In step S600, the electronic flash control unit 301 compares the charged voltage of the electronic flash charging unit 304 with a predetermined threshold. If the voltage is higher than the predetermined threshold (YES in step S600), the processing proceeds to step S601. In step S601, the electronic flash control unit 301 turns off charging control. In step S602, the electronic flash control unit 301 controls the current source 307 to perform synchronization control on a predetermined current.

On the other hand, if the voltage is lower than or equal to the predetermined threshold (NO in step S600), the processing proceeds to step S603. In step S603, the electronic flash control unit 301 turns the charging control on. In step S604, the electronic flash control unit 301 turns off the current source 307.

The electronic flash control unit 301 regularly performs the control illustrated in FIG. 11 for charging control.

In step S303, the camera 100 can obtain the state of the detection state signal CCC_I by communicating with the adaptor 200 using the serial communication signals 151.

In step S304, the camera control unit B 102 determines the charging state of the electronic flash 300 based on the obtained electronic flash charging information.

If it is determined that the electronic flash 300 has been charged, i.e., "electronic flash charging OK" (YES in step S304), the processing proceeds to step S305. On the other hand, if it is determined that the electronic flash 300 has not been charged, i.e., not "electronic flash charging is OK" (NO in step S304), the processing proceeds to step S306.

In steps S305 and S306, the camera control unit B 102 controls an AE operation. In step S305, the camera control unit B 102 determines the exposure parameters for situations where the electronic flash 300 emits light.

By contrast, in step S306, the camera control unit B 102 determines the exposure parameters for situations where the electronic flash 300 does not emit light.

In step S307, the camera control unit B 102 monitors a not-illustrated release button. If the release button is pressed (ON) (YES in step S307), the processing proceeds to step S308 to proceed with imaging processing. On the other hand, if the release button is not pressed (NO in step S307), the processing returns to step S301, and the camera control unit B 102 repeats the operations in steps S301 to S307.

In steps S308, S309, and S310, the camera control unit B 102 checks the connection and the changing state of the electronic flash 300. The connection of the electronic flash 300 is checked by a method similar to that in step S301. The charging state is checked by a method similar to that in step S308 or by using a result of the determination made in step S308. If the electronic flash 300 is not connected or the electronic flash 300 is not "electronic flash charging OK" (NO in step S308 or NO in step S310), the processing proceeds to step S319.

In step S319, the camera control unit B 102 determines the exposure parameters for situations where the electronic flash 300 does not emit light. In step S320, the camera control unit B 102 performs an exposure operation without light emission of the electronic flash 300.

In steps S308, S309, and S310, if the electronic flash 300 is connected and "electronic flash charging OK" (YES in step S308 and YES in step S310), the processing proceeds to step S311.

In step S311, the camera control unit B 102 perform an AE operation to determine the exposure parameters for situations where the electronic flash 300 emits light.

In step S312, the camera control unit B 102 transmits information for preliminary light emission control on the electronic flash 300. The information to be transmitted includes an emission trigger type, an emission method, and the amount of light emission.

As will be described below, possible emission trigger types include "SCLK synchronous emission" where the electronic flash 300 emits light in synchronization with the assertion of the signal SCLK_ST, and "XOUT synchronous emission" where the electronic flash 300 emits light in synchronization with the assertion of the signal SCLK_ST and the signal XOUT.

Possible emission methods include "flash emission" where the electronic flash light emission unit 305 is turned on only once to emit flashy light, and "flat emission" where control is performed so that the electronic flash light emission unit 305 is periodically turned on and off to emit a predetermined amount of light for a predetermined time. If the emission method is the flat emission, the information for the preliminary light emission control includes information about the light emission time.

In step S313, the camera control unit B 102 controls the electronic flash 300 to perform preliminary light emission via the adaptor 200.

The preliminary light emission is performed by "SCLK synchronous flash emission" or "SCLK synchronous flat emission".

Figure 14:
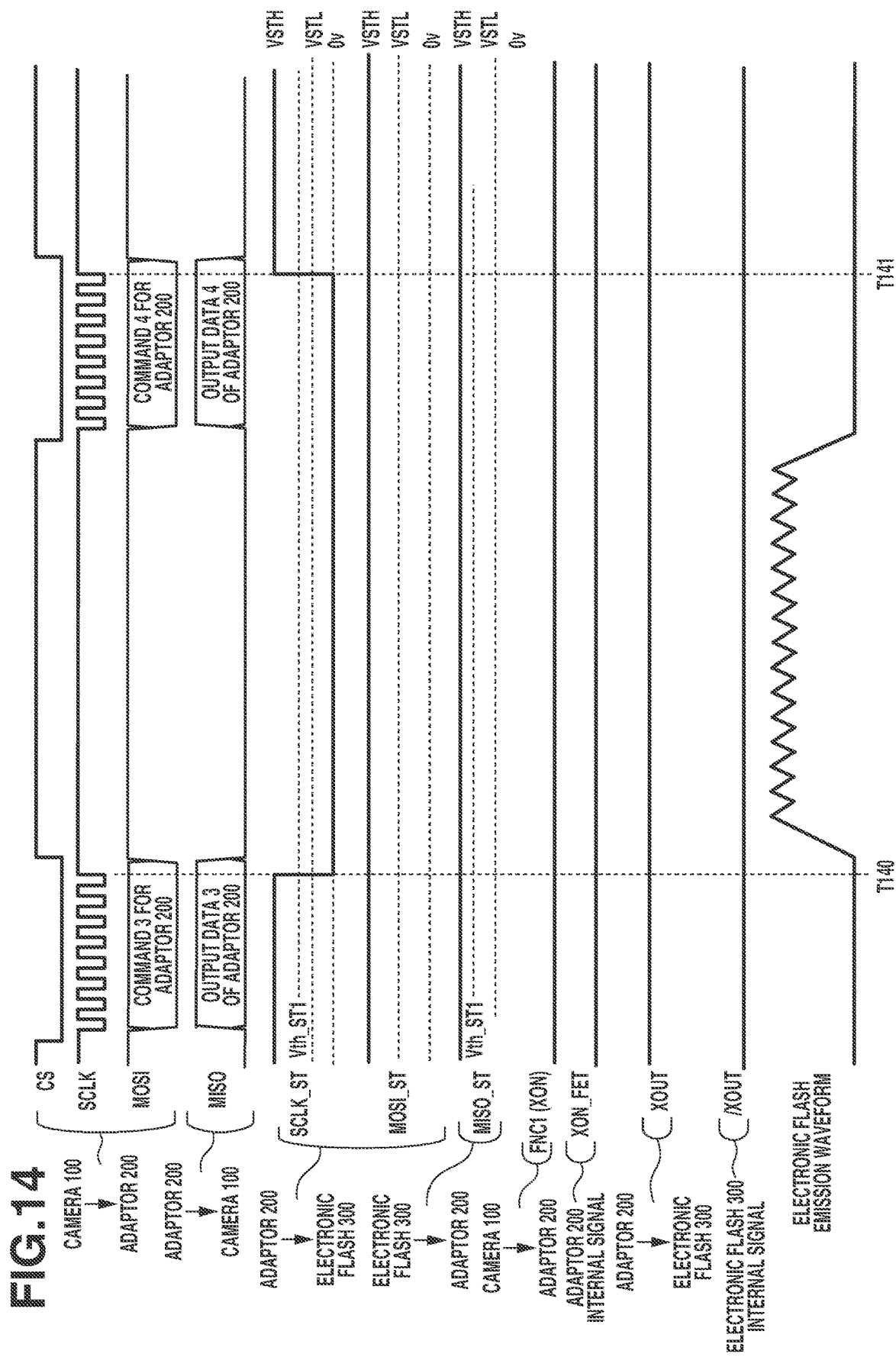
FIG. 14 is a timing chart illustrating a flat emission operation during the preliminary light emission by the camera, the adaptor, and the electronic flash according to the second exemplary embodiment.

After a lapse of a predetermined time, the camera 100 transmits command 4 for the adaptor 200 using the serial communication signals 151 (time T141; see FIG. 14). The adaptor 200 receives command 4 for the adaptor 200, and the adaptor control unit 201 controls the signal SCLK_ST to the level VSTH.

In step S314, the camera control unit B 102 obtains electronic flash information during the preliminary light emission and after the preliminary light emission from the electronic flash 300.

In step S315, the camera control unit B 102 calculates the amount of light emission of the electronic flash 300 for imaging (the amount of main light emission) based on the preliminary light emission processing of step S313 and the electronic flash information obtained in step S314.

In step S316, the camera control unit B 102 transmits information for main light emission control on the electronic flash 300. The information to be transmitted includes the emission trigger type, the emission method, and the amount of light emission. If the emission method is the flat emission, the information about the light emission time is included.

In step S317, the camera control unit B 102 controls the electronic flash 300 to perform the main light emission and controls the exposure operation of the image sensor 122 via the adaptor 200.

The main light emission is performed by the "XOUT synchronous flash emission" or the "SCLK synchronous flat emission".

In step S318, the camera control unit B 102 communicates with the electronic flash 300 to obtain the state after the main light emission. The processing ends.

<Preliminary Light Emission (S313): SCLK Synchronous Flash Emission (Step S313)>

Figure 13:
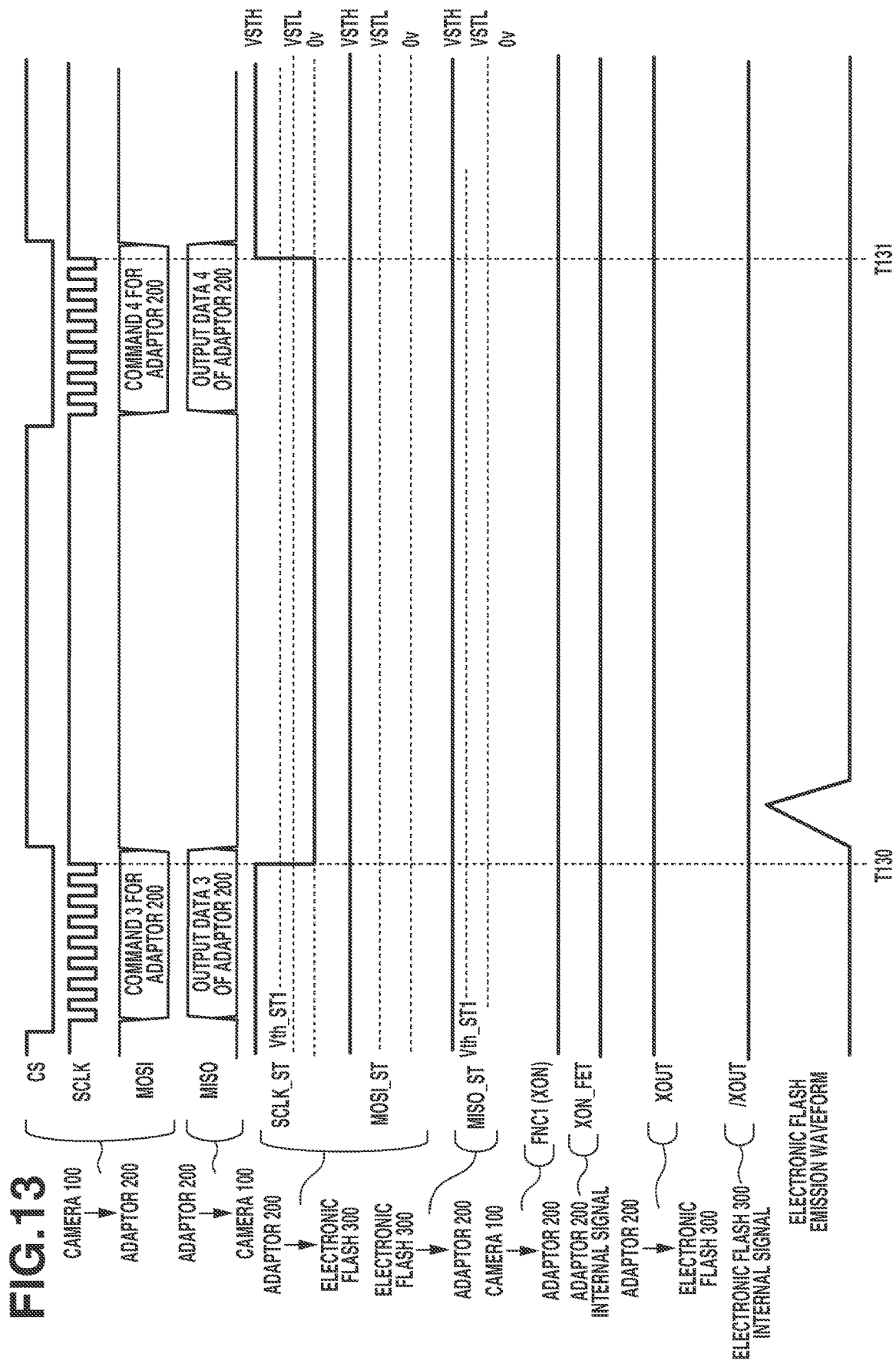
FIG. 13 is a timing chart illustrating a flash emission operation during preliminary light emission by a camera, the adaptor, and the electronic flash according to the second exemplary embodiment.

FIG. 13 is a timing chart illustrating the "SCLK synchronous flash emission". The camera 100 transmits command 3 for the adaptor 200 using the serial communication signals 151 (time T130). The adaptor 200 receives command 3 for the adaptor 200, and the adaptor control unit 201 controls the signal SCLK_ST to 0 V. In the electronic flash 300, the electronic flash control unit 301 detects that the signal SCLK_ST is set to 0 V, and controls the electronic flash light emission unit 305 to perform a flash emission operation based on the information received in step S312.

After a lapse of a predetermined time, the camera 100 transmits command 4 for the adaptor 200 using the serial communication signals 151 (time T131). The adaptor 200 receives command 4 for the adaptor 200, and the adaptor control unit 201 controls the signal SCLK_ST to the level VSTH.

<Preliminary Light Emission: SCLK Synchronous Flat Emission (Step S313)>

FIG. 14 is a timing chart illustrating the "SCLK synchronous flat emission". The camera 100 transmits command 3 for the adaptor 200 using the serial communication signals 151 (time T140). The adaptor 200 receives command 3 for the adaptor 200, and the adaptor control unit 201 controls the signal SCLK_ST to 0 V. In the electronic flash 300, the electronic flash control unit 301 detects that the signal SCLK_ST is set to 0 V, and controls the electronic flash light emission unit 305 to perform a flat emission operation based on the information received in step S312. After the light emission for the duration based on the information received in step S312, the electronic flash control unit 301 stops emitting light.

<Main Light Emission: XOUT Synchronous Flash Emission (Step S317)>

Figure 15:
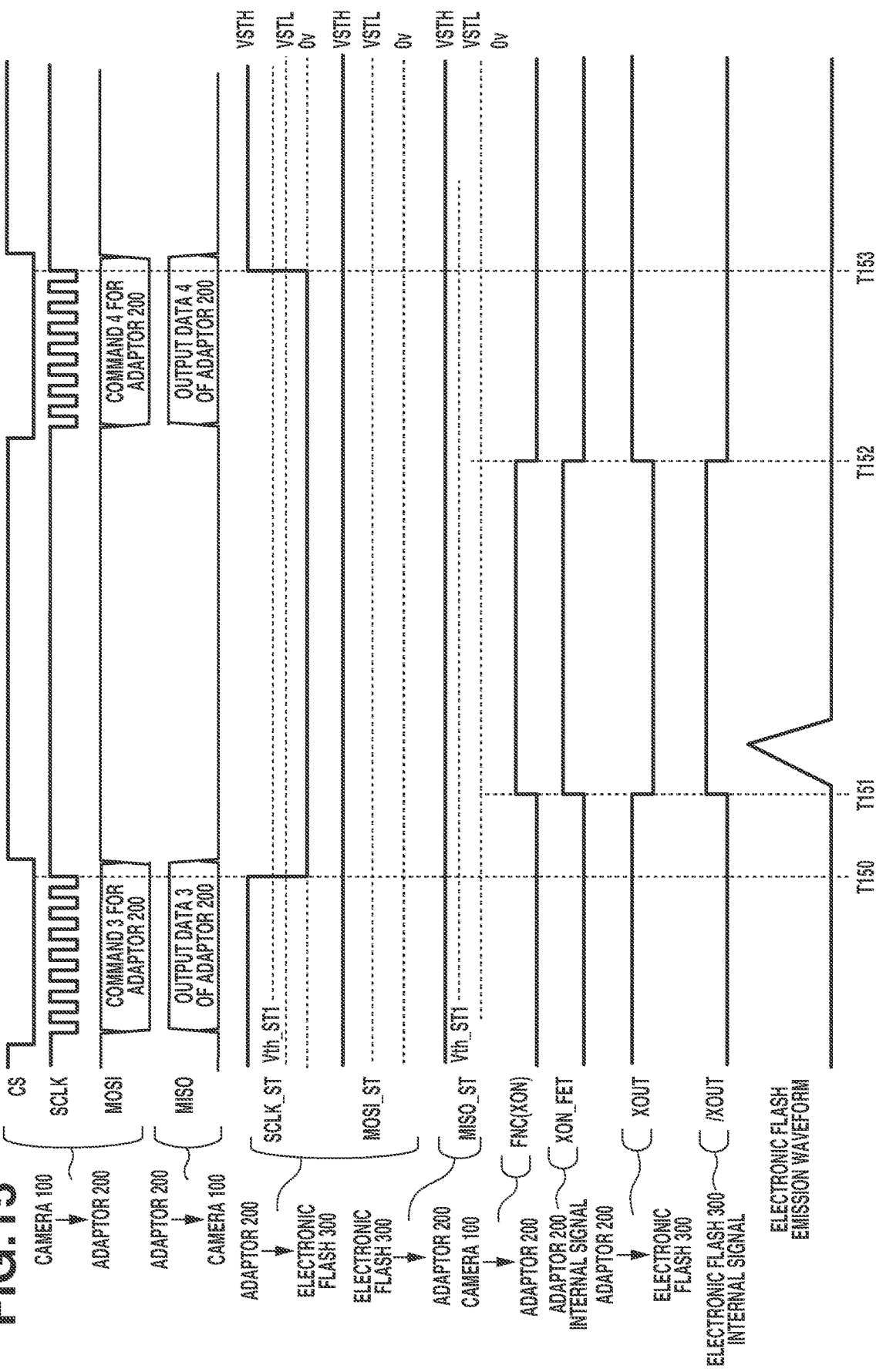
FIG. 15 is a timing chart illustrating a flash emission operation during main light emission by the camera, the adaptor, and the electronic flash according to the second exemplary embodiment.

FIG. 15 is a timing chart illustrating the "XOUT synchronous flash emission". The camera 100 transmits command 3 for the adaptor 200 using the serial communication signals 151 (time T150). The adaptor 200 receives command 3 for the adaptor 200, and the adaptor control unit 201 controls the signal SCLK_ST to 0 V. The electronic flash 300 does not emit light at time T150, since "XOUT synchronous flash emission" communication is received in step S316.

The camera 100 then asserts the FNC1 (XON) (time T151).

With the signal XON asserted, the adaptor control unit 201 sets the signal XON_FET to the high level to turn on the FET 206, so that the signal XOUT is set to the low level. Setting the signal XOUT to the low level turns on the transistor 309 of the electronic flash 300, and the signal /XOUT becomes the high level. The electronic flash control unit 301 detects that the signal /XOUT is at the high level, and starts a flash emission operation.

After a lapse of a predetermined time from the assertion of the signal XON, the camera control unit B 102 negates the FNC1 (XON) (time T152). With the signal XON negated, the adaptor control unit 201 sets the signal XON_FET to the low level to turn off the FET 206, so that the signal XOUT is set to the high level. Setting the signal XOUT to the high level turns off the transistor 309 of the electronic flash 300, and the signal /XOUT becomes the low level. The predetermined time is determined based on the shutter speed set in the camera 100.

After a lapse of a predetermined time, the camera 100 transmits command 4 for the adaptor 200 using the serial communication signals 151 (time T153). The adaptor 200 receives command 4 for the adaptor 200, and the adaptor control unit 201 controls the signal SCLK_ST to the level VSTH.

<Main Light Emission: SCLK Synchronous Flat Emission (Step S317)>

Figure 16:
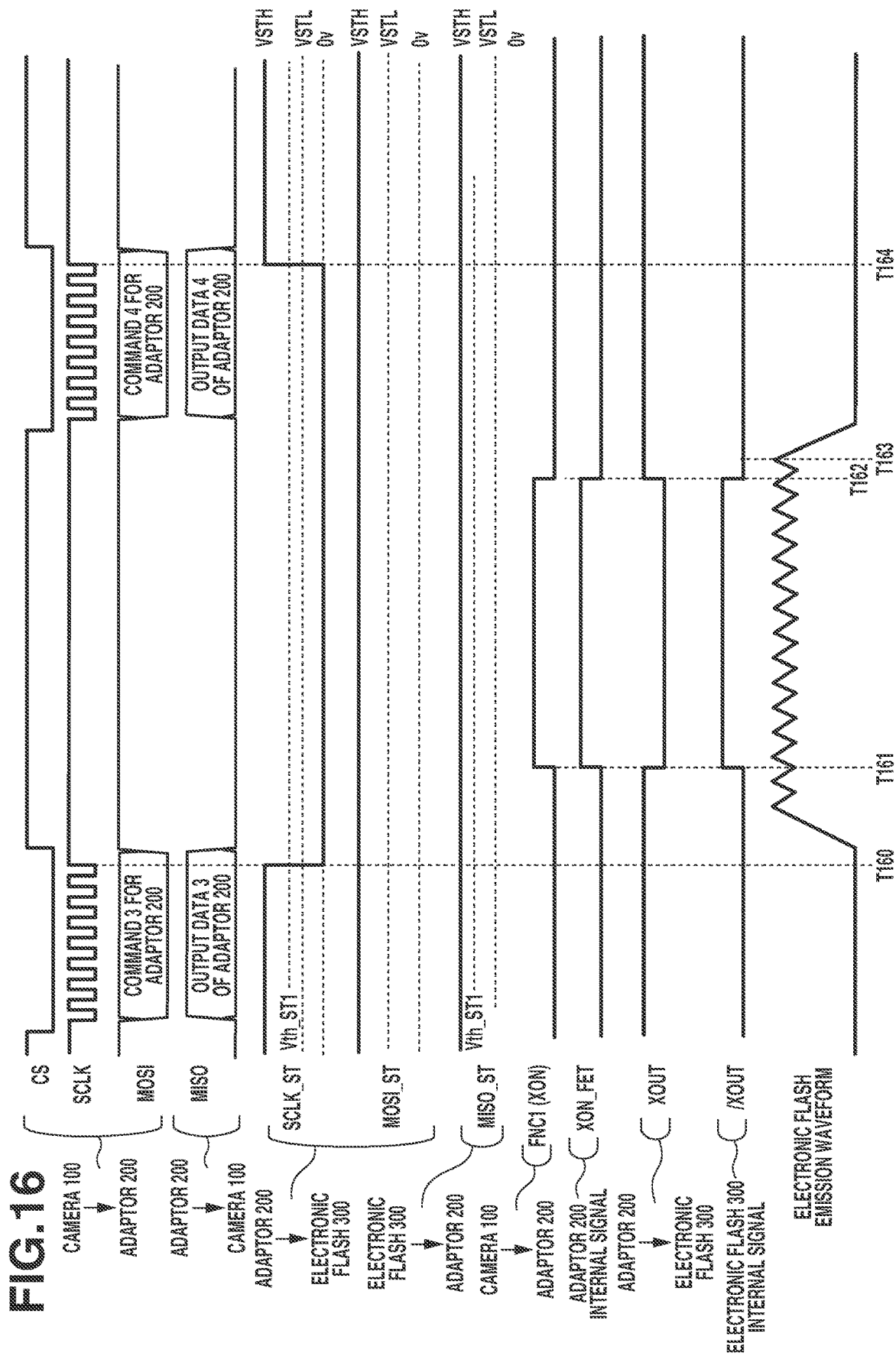
FIG. 16 is a timing chart illustrating a flat emission operation during the main light emission by the camera, the adaptor, and the electronic flash according to the second exemplary embodiment.

FIG. 16 is a timing chart illustrating the "SCLK synchronous flat emission" for main light emission. The camera 100 transmits command 3 for the adaptor 200 using the serial communication signals 151 (time T160). The adaptor 200 receives command 3 for the adaptor 200, and the adaptor control unit 201 controls the signal SCLK_ST to 0 V.

In the electronic flash 300, the electronic flash control unit 301 detects that the signal SCLK_ST is set to 0 V, and controls the electronic flash light emission unit 305 to perform a flat emission operation based on the information received in step S316.

Next, the camera 100 asserts the signal FNC1 (XON) based on the open/closed state of the shutter (time T161). With the signal XON asserted, the adaptor control unit 201 sets the signal XON_FET to the high level to turn on the FET 206, so that the signal XOUT is set to the low level. The low level of the signal XOUT turns on the transistor 309 of the electronic flash 300, and the signal/XOUT becomes the high level.

After a lapse of a predetermined time from the assertion of the signal XON, the camera 100 negates the signal FNC1 (XON) (time T162). With the signal XON negated, the adaptor control unit 201 sets the signal XON_FET to the low level to turn off the FET 206, so that the signal XOUT is set to the high level. Setting of the signal XOUT to the high level turns off the transistor 309 of the electronic flash 300, and the signal/XOUT becomes the low level.

The predetermined time is determined based on the shutter speed set in the camera 100.

After the light emission for the duration based on the information received in step S316, the electronic flash 300 stops emitting light.

After a lapse of a predetermined time, the camera 100 transmits command 4 for the adaptor 200 using the serial communication signals 151 (time T164). The adaptor 200 receives command 4 for the adaptor 200, and the adaptor control unit 201 controls the signal SCLK_ST to the level VSTH.

As described above, the electronic flash 300 continues emitting light during the period in which the signal XOUT is asserted.

This "SCLK synchronous flat emission" for main light emission is used in electronic flash imaging at high shutter speed.

The signal XOUT is controlled based on the open/closed state of the shutter. The image sensor 122 exposes an object image with light over the period where the signal XOUT is asserted.

<Transmission of Communication Request from Electronic Flash>

Details of the operation for notifying the camera 100 of the communication request from the electronic flash 300 via the adaptor 200 will be described with reference to FIGS. 17 and 18.

Figure 17:
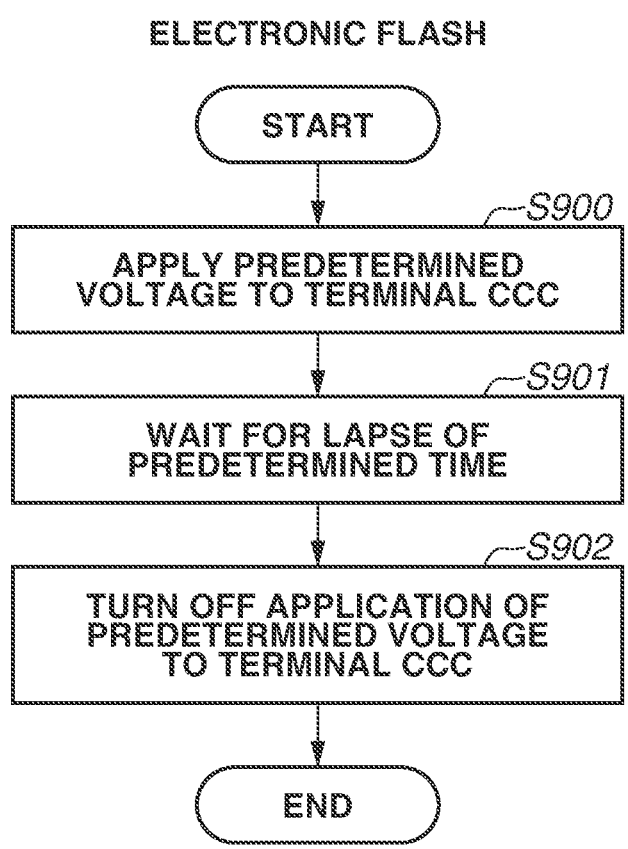
FIG. 17 is a flowchart illustrating an interrupt operation on the camera by the electronic flash according to the second exemplary embodiment.

FIG. 17 is a flowchart when the electronic flash 300 requests communication from the camera 100.

In step S900, the electronic flash control unit 301, in requesting communication from the camera 100, applies a predetermined voltage to the terminal CCC.

In steps S901 and S902, the electronic flash control unit 301 turns off the application of the predetermined voltage to the terminal CCC after a lapse of a predetermined time.

FIG. 18 illustrates a control flowchart of the adaptor 200 here.

In step S1000, if the CCC voltage (voltage applied to the terminal CCC) is higher than a predetermined threshold CCC_V_TH and the detection state signal CCC_V becomes the high level (YES in step S1000), the processing proceeds to step S1001. In step S1001, the adaptor control unit 201 asserts the communication request signal/WAKE.

The camera 100 starts to communicate with the electronic flash control unit 301 by an interrupt operation due to the communication request signal/WAKE. FIG. 6 illustrates the timing chart of such an operation.

As described above, according to the present exemplary embodiment, the automatic light amount control operation of the electronic flash 300 can be appropriately performed even if the camera 100 and the accessory (including electronic flash 300) have different configurations for notification or communication.

While an electronic apparatus that is connected to the adaptor 200 has been described to be the electronic flash 300 in the exemplary embodiments, an apparatus different from the electronic flash 300, such as a Global Positioning System (GPS) unit, is also applicable.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-120276, filed Jul. 21, 2021, and No. 2021-181189, filed Nov. 5, 2021, which are hereby incorporated by reference herein in their entirety.

What is claimed is:

1. An adaptor device to be attached between an imaging apparatus and an accessory device, the adaptor device comprising:
one or more circuits configured to function as:
a control unit configured to control communication with the imaging apparatus via a first contact, a second contact, and a third contact, and communication with the accessory device via a fourth contact and a fifth contact,
wherein the control unit has a first communication mode in which transmission of data via the fourth contact based on reception of data from the first contact or transmission of data via the second contact based on reception of data via the fifth contact is controlled, and a second communication mode which is different from the first communication mode, and is configured to receive, in the second communication mode, a second command and data via the first contact and then transmit the data via the fourth contact, and
wherein the control unit is configured to communicate in the first communication mode, based on connection detection communication with the accessory device in the second communication mode and a first command corresponding to an instruction to enter the first communication mode.

2. The adaptor device according to claim 1, wherein the control unit is configured to control, in the connection detection communication, transmission of a third notification via the third contact based on reception of a second notification via the fifth contact based on transmission of a first notification via the fourth contact based on reception of the second command via the first contact.

3. The adaptor device according to claim 2, wherein the control unit is configured to issue the first notification by changing a signal level of the fourth contact from a first signal level to a second signal level higher than the first signal level.

4. The adaptor device according to claim 2, wherein the second notification is issued by changing a signal level of the fifth contact from a third signal level to a fourth signal level higher than the third signal level.

5. The adaptor device according to claim 2, wherein the control unit is configured to issue the third notification by changing a signal level of the third contact from a fifth signal level to a sixth signal level higher than the fifth signal level.

6. The adaptor device according to claim 1, wherein the control unit is configured to communicate the data to be communicated via the first contact and the fifth contact in synchronization with a clock signal received via a sixth contact.

7. The adaptor device according to claim 1, wherein the first communication mode is a mode in which the data received via the first contact is changed in voltage level and transmitted via the fourth contact.

8. An imaging apparatus to which an accessory device is attached via an adaptor device, the imaging apparatus comprising:
one or more circuits configured to function as:
a control unit configured to control communication with the adaptor device via a first contact, a second contact, and a third contact,
wherein the control unit has a first communication mode in which communication with the accessory device via the adaptor device is controlled via the first contact and the second contact, and a second communication mode different from the first communication mode, and is configured to transmit, in the second communication mode, a second command and data via the first contact, and
wherein the control unit is configured to communicate in the first communication mode based on connection detection communication with the accessory device in the second communication mode and transmission of a first command corresponding to an instruction to enter the first communication mode.

9. The imaging apparatus according to claim 8, wherein the control unit is configured to receive, in the connection detection communication, a notification via the third contact based on transmission of the second command via the first contact.

10. The imaging apparatus according to claim 8, wherein the control unit is configured to receive a notification by changing a signal level of the third contact from a fifth signal level to a sixth signal level higher than the fifth signal level.

11. The imaging apparatus according to claim 10, wherein the control unit is configured to communicate data to be communicated via the first contact and a fifth contact in synchronization with a clock signal transmitted via a sixth contact.

12. A method for controlling an adaptor device to be attached between an imaging apparatus and an accessory device, the method comprising:
controlling communication with the imaging apparatus via a first contact, a second contact, and a third contact, and communication with the accessory device via a fourth contact and a fifth contact,
wherein the controlling includes performing communication in a first communication mode in which transmission of data via the fourth contact based on reception of data from the first contact or transmission of data via the second contact based on reception of data via the fifth contact is controlled and communication in a second communication mode different from the first communication mode, and in the second communication mode, a second command and data are received via the first contact and then the data is transmitted via the fourth contact, and
wherein the communication in the first communication mode is performed based on connection detection communication with the accessory device in the second communication mode and a first command corresponding to an instruction to enter the first communication mode.

13. A method for controlling an imaging apparatus to which an accessory device is attached via an adaptor device, the method comprising:
controlling communication with the adaptor device via a first contact, a second contact, and a third contact,
wherein the controlling includes performing communication in a first communication mode in which communication with the accessory device via the adaptor device is controlled via the first contact and the second contact and communication in a second communication mode different from the first communication mode, and in the second communication mode, a second command and data are transmitted via the first contact, and
wherein the communication in the first communication mode is performed based on connection detection communication with the accessory device in the second communication mode and transmission of a first command corresponding to an instruction to enter the first communication mode.

* * * * *